(12) United States Patent
Rasidescu et al.

(10) Patent No.: US 7,377,347 B2
(45) Date of Patent: May 27, 2008

(54) THREE-SEAT SNOWMOBILE WITH MODULAR SEAT

(75) Inventors: Mihai Rasidescu, Sherbrooke (CA); Steve Langlais, Orford (CA); Yvon Bédard, Orford (CA)

(73) Assignee: Bombardier Recreational Products Inc., Valcourt (CA)

( * ) Notice: Subject to any disclaimer, the term of this patent is extended or adjusted under 35 U.S.C. 154(b) by 266 days.

(21) Appl. No.: 11/212,754

(22) Filed: Aug. 29, 2005

(65) Prior Publication Data

US 2006/0042847 A1 Mar. 2, 2006

Related U.S. Application Data

(63) Continuation-in-part of application No. 11/040,112, filed on Jan. 24, 2005, now abandoned, which is a continuation of application No. 10/851,476, filed on May 22, 2004, now abandoned.

(60) Provisional application No. 60/472,733, filed on May 23, 2003, provisional application No. 60/654,383, filed on Feb. 18, 2005.

(51) Int. Cl.
*B62D 55/07* (2006.01)

(52) U.S. Cl. .................................. 180/190; 297/215.12
(58) Field of Classification Search ................ 180/182, 180/190; 297/215.12; 197/195.1, 195.11, 197/195.12, 195.13
See application file for complete search history.

(56) References Cited

U.S. PATENT DOCUMENTS

| 3,736,020 | A | * | 5/1973 | Pilachowski et al. | .......... 296/63 |
| 4,679,647 | A | * | 7/1987 | Komuro | ...................... 180/219 |
| 4,779,695 | A | * | 10/1988 | Yasui | .......................... 180/190 |
| 5,634,685 | A | * | 6/1997 | Herring | ................. 297/219.11 |
| 5,660,245 | A | * | 8/1997 | Marier et al. | ................ 180/190 |
| 5,944,380 | A | * | 8/1999 | Atherley | ................... 297/195.1 |
| 6,491,124 | B1 | * | 12/2002 | Thompson et al. | .......... 180/190 |
| 6,749,036 | B1 | * | 6/2004 | Schrapp et al. | ............. 180/190 |
| 6,796,607 | B2 | * | 9/2004 | Bertrand et al. | ........ 297/195.13 |

* cited by examiner

*Primary Examiner*—Kevin Hurley
(74) *Attorney, Agent, or Firm*—Osler, Hoskin & Harcourt LLP

(57) ABSTRACT

A snowmobile straddle seat assembly designed to accommodate one, two or three riders. The seat may have a continuous surface including three seating positions thereon or it may include separate seat portions where the separate seat portions may be selectively removed to provide storage space and a variety of seat configurations.

18 Claims, 25 Drawing Sheets

| DISTANCE [mm] | | CONVENTIONAL | | VEHICLE INVENTION | | | | | |
|---|---|---|---|---|---|---|---|---|---|
| | | | | 1ST EMBODIMENT 2 UP LONG (FIG. 2) | 2ND EMBODIMENT 2 UP SHORT (FIG. 3) | 3RD EMBODIMENT 1+1 SHORT (FIG. 4A) | 4TH EMBODIMENT 3 UP LONG (FIG. 5) | 5TH EMBODIMENT 2+1 LONG (FIG. 6A) | 6TH EMBODIMENT 1 UP (FIG. 7) |
| REF.# | FROM | TO (GOING BACK) | LONG | SHORT | | | | | | |
| A | FORWARD AXLE | CG (VEHICLE) | 110 | 30 | 65 | 95 | 95 | 95 | 170 | 95 |
| B | STEERING POS. | CG (VEHICLE) | -160 | -240 | 130 | 160 | 160 | 160 | 235 | 160 |
| C | CG (VEHICLE) | CG (RIDER 1) | 645 | 725 | 350 | 320 | 320 | 245 | 245 | 320 |
| D | CG (VEHICLE) | SEAT POS (1) | 785 | 875 | 500 | 470 | 470 | 385 | 385 | 470 |
| E | CG (RIDER 1) | CG (RIDER 2) | 370 | 370 | 370 | 370 | 370 | 370 | 370 | |
| F | SEAT POS (1) | SEAT POS (2) | 340 | 340 | 340 | 340 | 340 | | | |
| G | CG (RIDER 2) | CG (RIDER 3) | NA | NA | | | NA | 310 | 345 | NA |
| H | SEAT POS (2) | SEAT POS (3) | NA | NA | | | NA | 310 | 345 | NA |
| I | CG (VEHICLE) | CG (V+1 RIDER) | 180 | 160 | 70 | 50 | 50 | 60 | 70 | 50 |
| J | CG (VEHICLE) | CG (V+2 RIDERS) | 250 | 230 | 175 | 160 | 160 | 170 | 170 | NA |
| K | CG (VEHICLE) | CG (V+3 RIDERS) | NA | NA | NA | NA | NA | 330 | 330 | NA |
| L | STEER POS. | REAR SEAT POS. | 975 | 975 | 970 | 970 | 970 | 1260 | 1265 | NA |
| M | BACK OF FRAME | BACK OF SEAT | -60 | 0 | 100 | -10 | 230 | 60 | 260 | -110 |
| N | BACK OF FRAME | REAR SEAT POS. | -250 | -120 | -130 | -340 | 60 | -230 | 60 | -260 |
| ANGLES (DEGREES) | | | | | | | | | | |
| EPSILON VERT. AND STEERING SHAFT | | | 45 | 45 | ALL <45, PREFERABLY 25-40, MORE PREFERABLY 30-35, MOST PREFERABLY 33 | | | | | |

*FIG. 8*

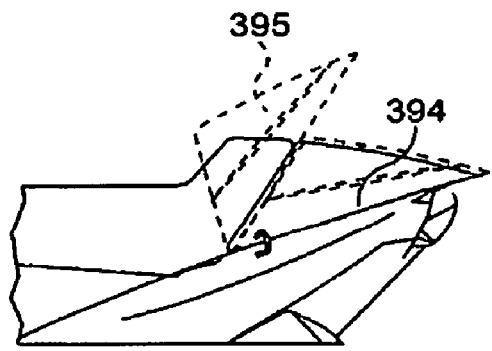 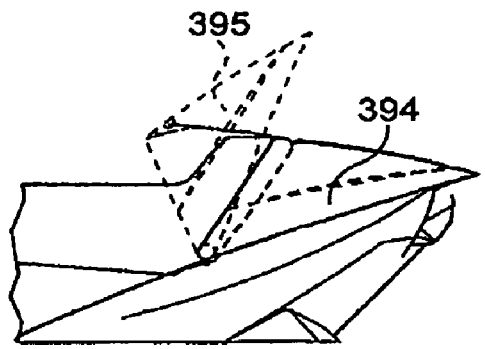
FIG. 11A  FIG. 11B
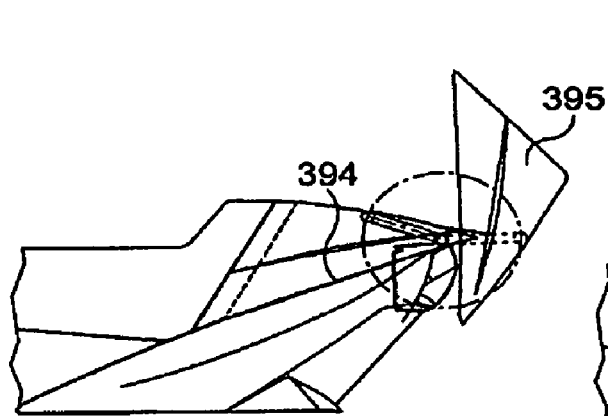 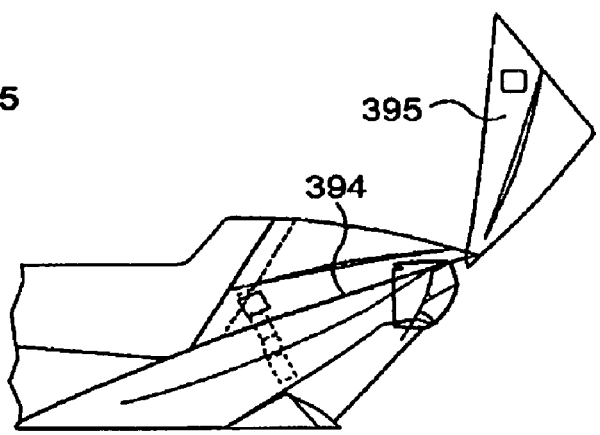
FIG. 11C  FIG. 11D

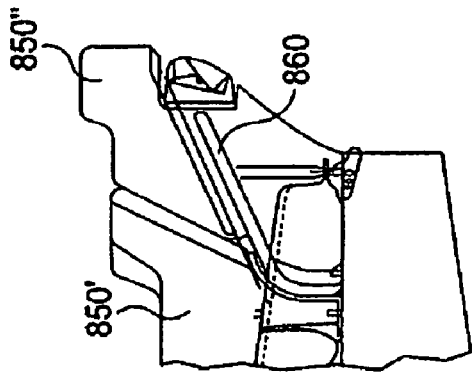
FIG. 12C
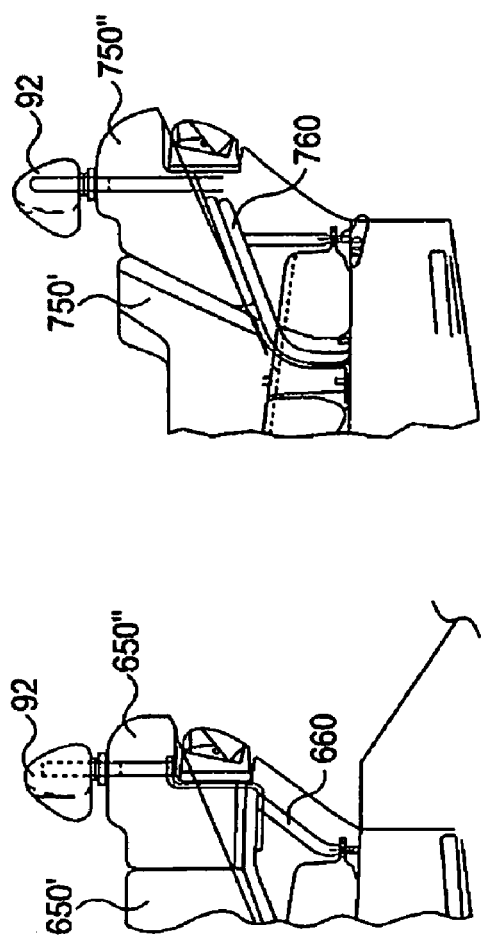
FIG. 12B
FIG. 12A
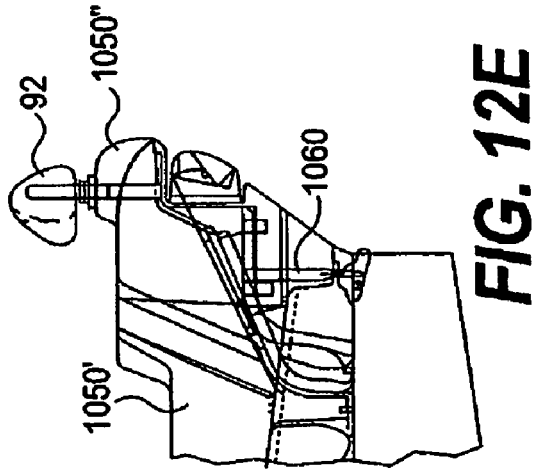
FIG. 12E
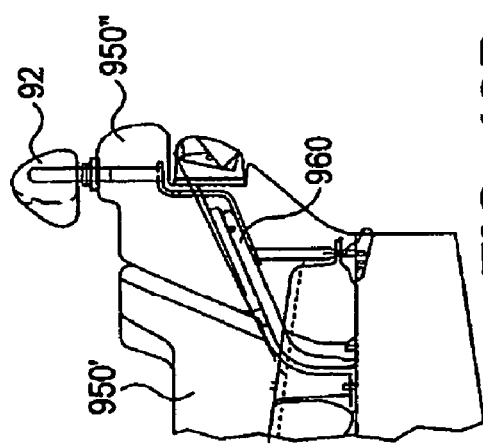
FIG. 12D

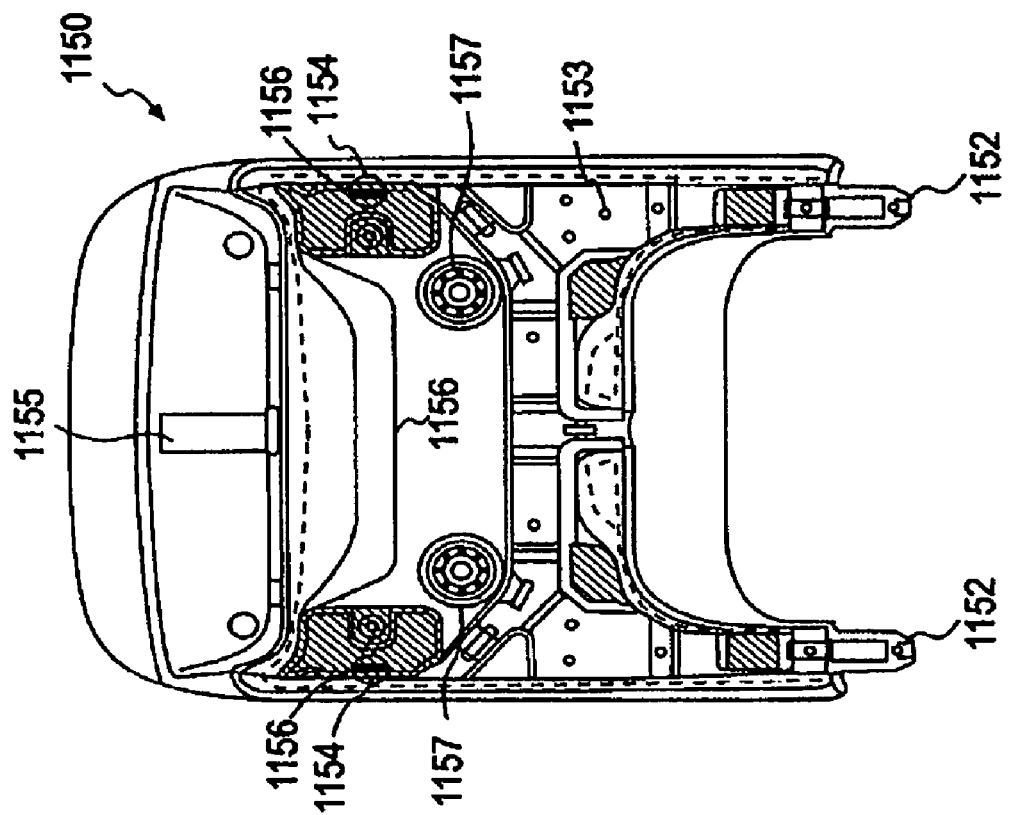

THREE-SEAT SNOWMOBILE WITH MODULAR SEAT

This application is a continuation-in-part of U.S. patent application Ser. No. 11/040,112 filed on Jan. 24, 2005, now abandoned. The '112 application was a continuation of U.S. patent application Ser. No. 10/851,476 filed on May 22, 2004, now abandoned. Through the '476 application, this application claims the benefit of priority to U.S. patent application No. 60/472,733 filed on May 23, 2003. This application also claims the benefit of priority to U.S. patent application No. 60/654,383, filed Feb. 18, 2005. All of the aforementioned applications are incorporated herein by reference. This application also incorporates by reference the following U.S. patent applications, Ser. No. 09/877,188, filed on Jun. 11, 2001; Ser. No. 09/472,134, filed on Dec. 23, 1999; 60/167,614, filed on Nov. 26, 1999; and Canadian Patent Application No. 2,256,944, filed on Dec. 23, 1998.

BACKGROUND OF THE INVENTION

1. Field of the Invention

The present invention relates generally to the overall design and construction of a snowmobile, and more particularly to a design of a snowmobile with a modular seat assembly.

2. Description of the Related Art

Conventional two-up snowmobiles share one of two common seat constructions: the seat is either formed as a one-piece structure having the driver and first passenger seating positions on a continuous surface, or, as is shown and described in U.S. Pat. No. 6,491,124, the first passenger seating position is situated on a removable seat portion placed behind a separate front seat portion including the driver seat position.

After-market removable first passenger seat portions are also available for one-up snowmobiles. Although one-up snowmobiles have no particular position to accept a removable first passenger seat portion, these after-market seats are simply strapped to the rear of the snowmobile in such a manner to allow the first passenger to safely sit behind the driver.

While the positioning of the driver and passenger on the conventional snowmobile is entirely adequate for enjoying the sport of snowmobiling, a desire has developed for a snowmobile that may comfortably accommodate two passengers in addition to the driver (3-up rider positioning). Consequently, a need as developed for a new and improved modular seat for snowmobiles which can be used in a one-up, two-up, and three-up configuration.

SUMMARY OF THE INVENTION

The present invention improves upon the conventional seat design by facilitating the addition of a third seat for a third rider, who experiences a reasonably comfortable ride.

One aspect of the present invention is to provide a snowmobile having a frame, an engine disposed on the frame in front of the seat; a drive track disposed below the frame and connected operatively to the engine for propulsion of the snowmobile; two skis disposed on the frame; a steering device; and a straddle seat assembly attached to the frame, the straddle seat assembly comprising a first seat portion for a driver, a second seat portion for a first passenger, the second seat portion being disposed behind the first seat portion, a third seat portion for a second passenger, the second and third seat portions being selectively detachable from the frame.

Another aspect of the present invention provides the snowmobile with a tunnel, the seat assembly being attached to the tunnel.

Yet another aspect of the present invention has the second seat portion and the third seat portion integral and only detachable from the frame as a unit.

Still another aspect of the invention has the first seat portion selectively detachable from the frame.

Another aspect of the present invention has a storage space created when one of the second and third seat portions are detached from the frame.

Yet another aspect of the present invention has the second and third seat portions separately detachable from the frame.

Still another aspect of the present invention has the third seat portion selectively releasably attached to the frame adjacent to the frame adjacent to and rearward of the first seat portion when the second seat portion has been detached from the frame.

Yet another aspect of the present invention has a storage space behind the third seat portion when the third seat portion is attached to the frame adjacent and rearward the first seat portion.

Still another aspect of the present invention includes a backrest mounted to the third seat portion.

Another aspect of the present invention has the backrest removable from the third seat portion.

Still another aspect of the present invention has the third seat portion constructed and arranged to be selectively releasably attachable to the frame adjacent to and rearward of the first seat portion and the second seat portion is constructed and arranged to be selectively releasable attachable to the frame adjacent to and rearward of the third seat portion, whereby the second seat portion and the third seat portion are interchangeable on the snowmobile.

Yet another aspect of the present invention has the seat portions comprise seat surfaces, the seat surfaces of the second and third seat portions are higher than the surface of the first seat portion.

Still another aspect of the present invention has the seat surface of the third seat portion higher than the seat surface of the second seat portion.

Yet another aspect of the present inventions provides the second seat portion selectively detachable from the frame.

Another aspect of the present invention has the second and third seat portions permanently attached to each other and are selectively detachable from the frame.

Yet another aspect of the present invention provides a backrest mounted to the third seat portion and the first seat portion, wherein the first seat portion further includes a backrest mounting pivot, and the backrest is removably mounted to the third seat portion and capable of being removably mounting to the backrest mounting pivot on the first seat portion.

Another aspect of the present invention is to have the first seat portion with a first seat surface, the second seat portion has a second seat surface that is higher than the first seat surface, and the third seat portion has a third seat surface that is higher than the first seat surface.

Yet another aspect of the present invention provides a snowmobile comprising a frame; an engine disposed on the frame in front of the seat; a drive track disposed below the frame and connected operatively to the engine for propulsion of the snowmobile; two skis disposed on the frame; a steering device disposed on the frame forward of the seat assembly and operatively connected to the two skis for steering the snowmobile; and a straddle seat assembly attached to the frame, the straddle seat comprising a first seat portion for a driver, a second seat portion for a first passenger, and a third seat portion for a second passenger, each of the seat positions comprising a seat surface, the seat surface of the second seat position and the seat surface of the third seat position being higher than the seat surface of the first seat position.

Additional and/or alternative aspects, objects, and features of embodiments of the present invention will be made more apparent in the description that follows.

BRIEF DESCRIPTION OF THE DRAWINGS

Various exemplary embodiments of the present invention will be described with reference to the following drawings, wherein like reference numbers denote like features, in which:

FIG. 8 is a table comparing various dimensions of conventional snowmobiles and snowmobiles according to the present invention;

FIGS. 11A through 11D show the operation of a cover according to either the third or fifth embodiment;

FIGS. 12A through 12E show alternative seat and support arrangements for either the third or fifth embodiment;

FIG. 13C is a bottom view of the third seat portion.

DESCRIPTION OF EXEMPLARY EMBODIMENTS

Figure 1:
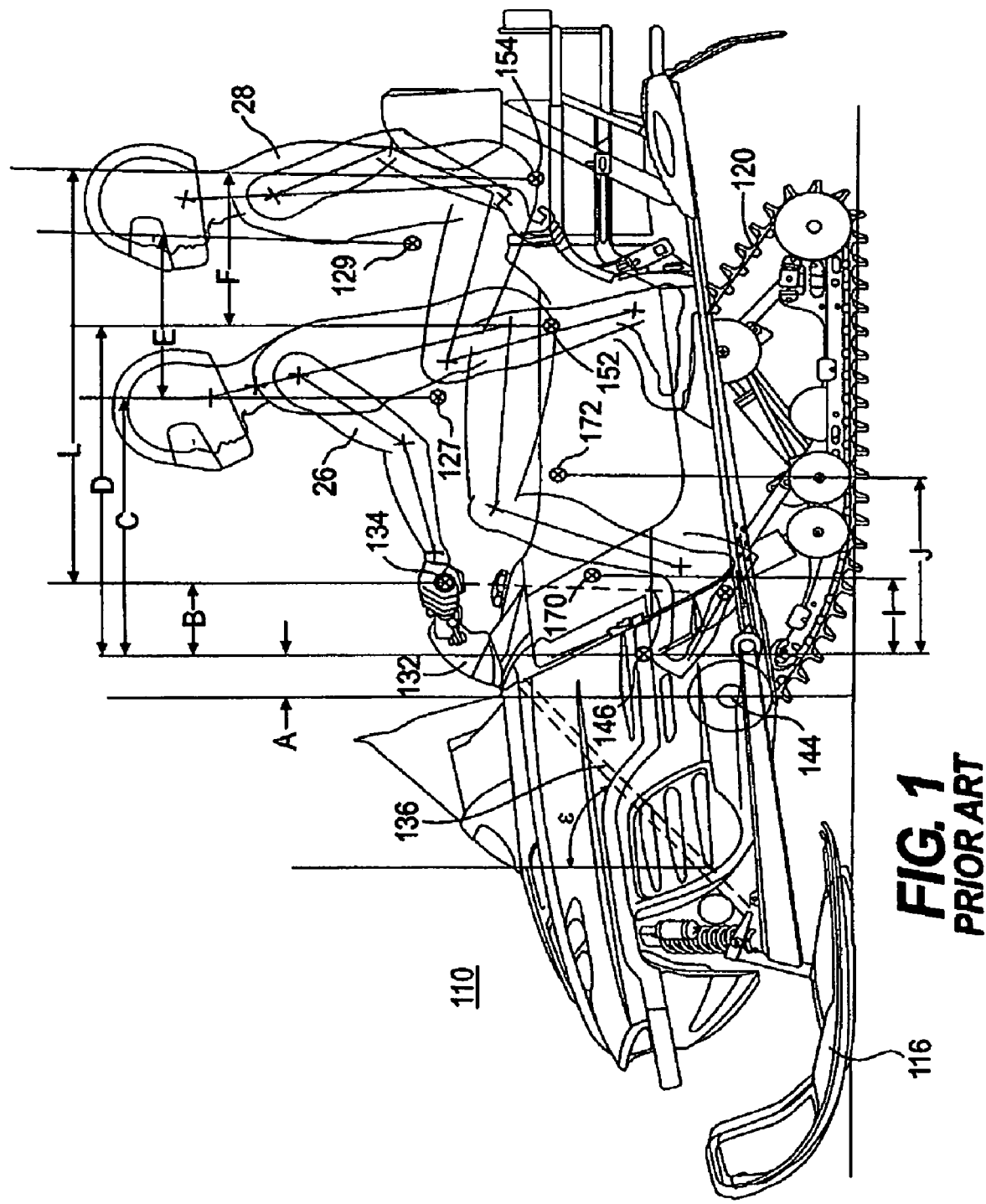
FIG. 1 is a side view illustration of a conventional snowmobile.

Throughout the description of the various embodiments of the present invention, reference will be made to various elements, the construction of which is readily known to those skilled in the art. Accordingly, an exhaustive description of each and every component is not provided. Components that are similar to components in other embodiments will be referenced by identical reference characters but with different prefix digits.

To facilitate comparison of the present invention to the conventional snowmobile, several additional aspects of the conventional snowmobile 110 must be identified. As shown in FIG. 1, the steering shaft 136 operatively connects the steering device 132 to the skis 116. The steering device 132 has a steering position 134, which is defined in the same manner as in the below embodiments. The driver (first rider) 26 has a center of gravity 127, which is located slightly forward of his torso because his arms and legs extend forward of his body while riding the snowmobile 110, and sits in a seat position 152. Similarly, the first passenger (second rider) 28 has a center of gravity 129, and sits in a seat position 154. A combined center of gravity 170 of the snowmobile 110 and the first rider 26 is located behind the center of gravity 146 of the snowmobile 110 without riders. A combined center of gravity 172 of the snowmobile 110 and first and second riders 26, 28 is located farther behind the center of gravity 146 of the snowmobile 110 without any riders.

Figure 2:
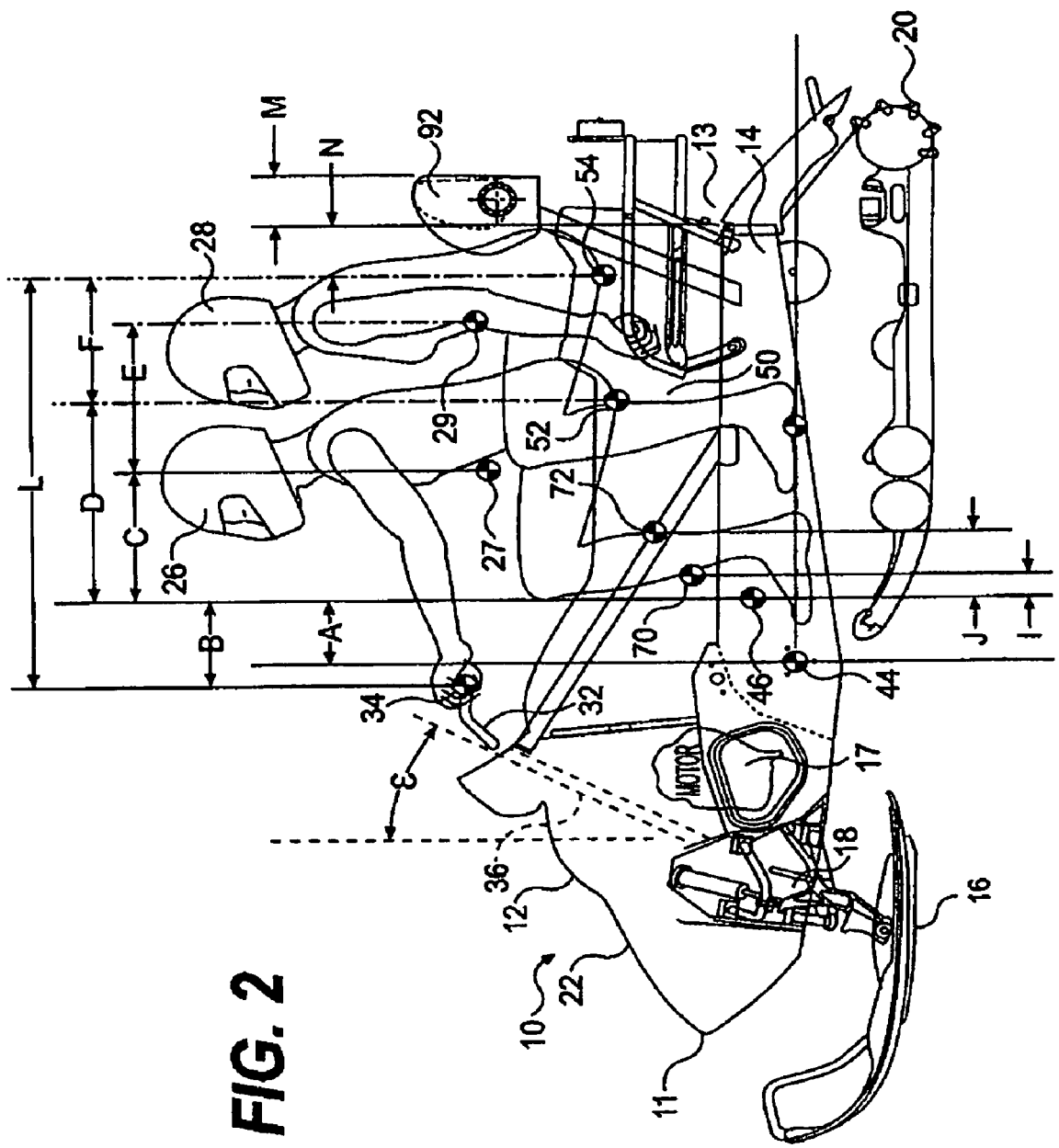
FIG. 2 is a side view illustration of a snowmobile according to a first embodiment of the present invention.
Figure 3:
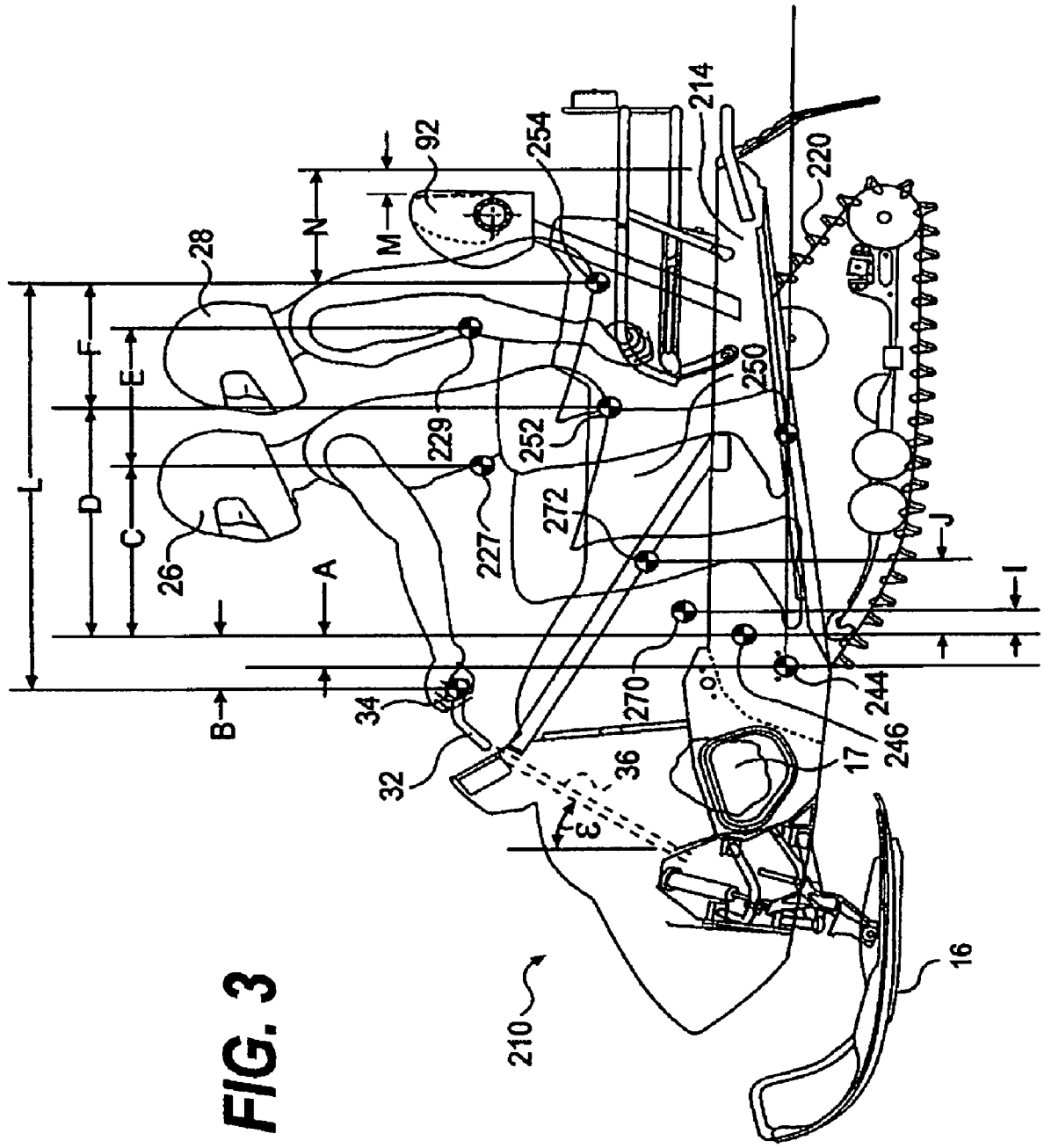
FIG. 3 is a side view illustration of snowmobile according to a second embodiment of the present invention.
Figure 4:
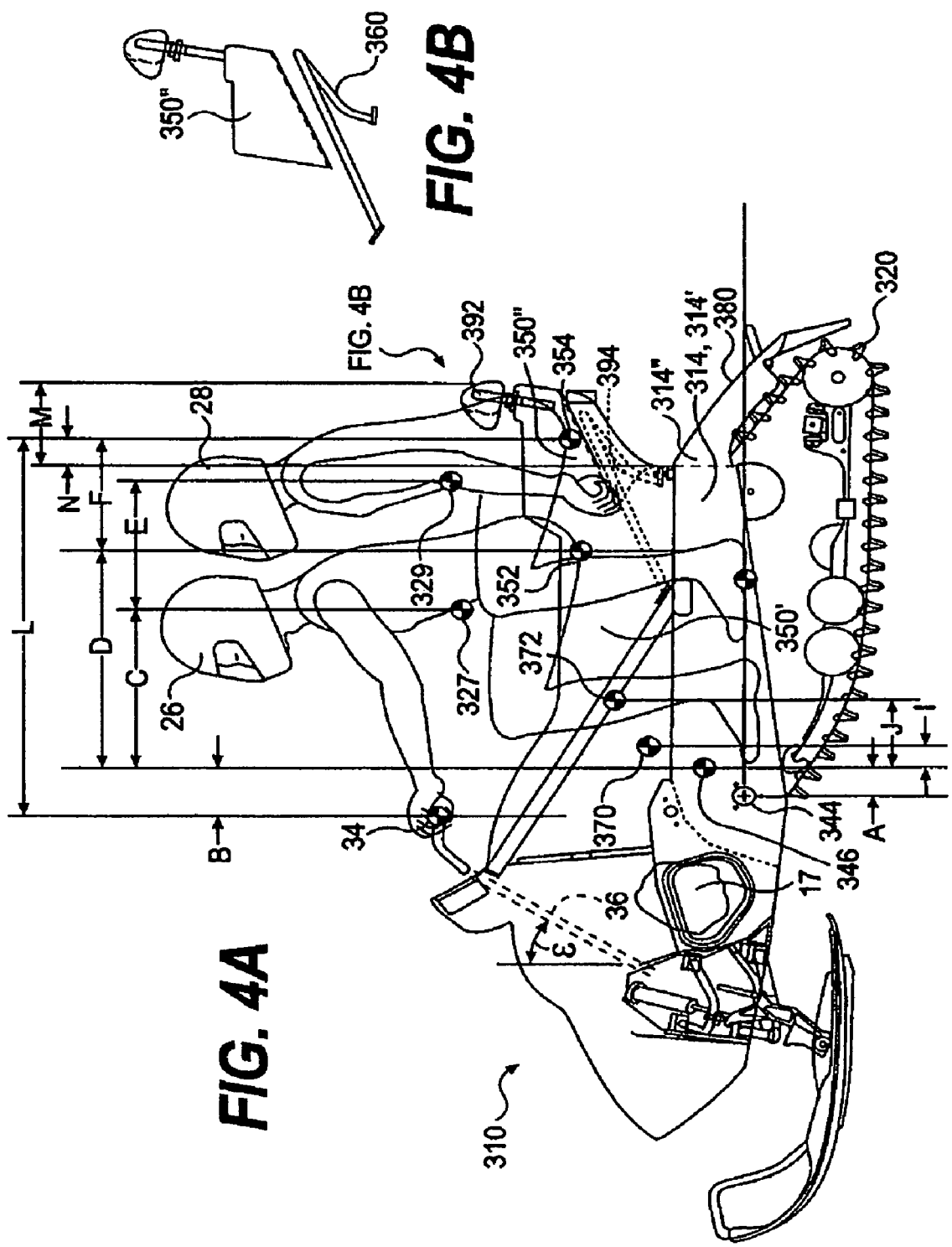
FIGS. 4A and 4B show side views of a snowmobile according to a third embodiment of the present invention.

FIG. 2 illustrates a first embodiment of the snowmobile 10. The snowmobile 10 has a forward end 11 and a rearward end 13 that are defined consistently with the travel direction of the snowmobile 10. The snowmobile 10 includes a body 12 (i.e., the exterior upper portions) and a frame 14. A motor 17, such as an internal combustion engine, is carried by the frame 14 at the forward end 11. In addition, two skis 16 are attached to the forward end 11 of the frame 14 through a suspension system 18. It should be noted, however, that a single centered ski would also work with the invention. A drive track 20 is disposed under frame 14 and is connected operatively to the engine 17 for propulsion of the snowmobile 10.

At the front 11 of the frame 14, the snowmobile 10 includes fairings 22 that enclose the engine 17 to protect it and to provide an external shell that can be decorated so that the snowmobile 10 is aesthetically pleasing. Typically, the fairings 22 comprise a hood and a bottom pad (neither of which have been individually identified in the drawing figures). A windshield (not shown) may be connected to fairings 22 near the forward end 11 of snowmobile 10 in front of a steering device 32 to lessen the force of the air on the first rider (driver) 26 when the snowmobile 10 is moving.

A straddle seat 50 is disposed on the frame 14 behind the engine 17. The seat 50 has a first seat position 52, which is defined as a portion of the seat 50 that is adapted to support a center of a weight distribution of the first rider 26 on the seat 50. Because snowmobiles typically have elongated straddle seats and are adapted to permit riders to sit in a variety of front-back positions, numerous seat positions will exist on any straddle seat. The inventors of the present invention define the term "seat position" to point out particular positions on the snowmobile that are adapted to function as the seat position for a standard rider.

Figure 9:
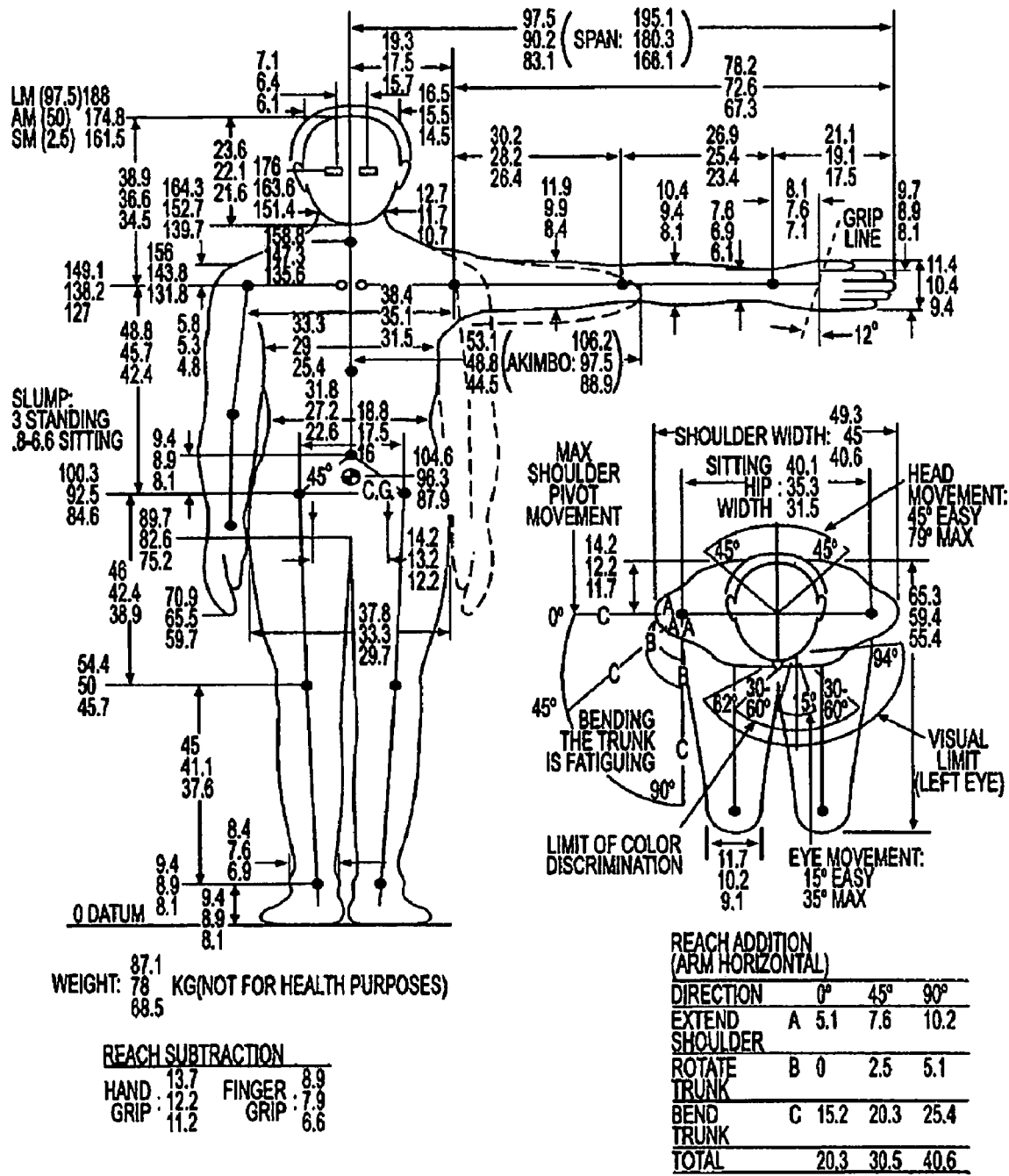
FIGS. 9 and 10 show the dimensions of a standard rider.
Figure 10:
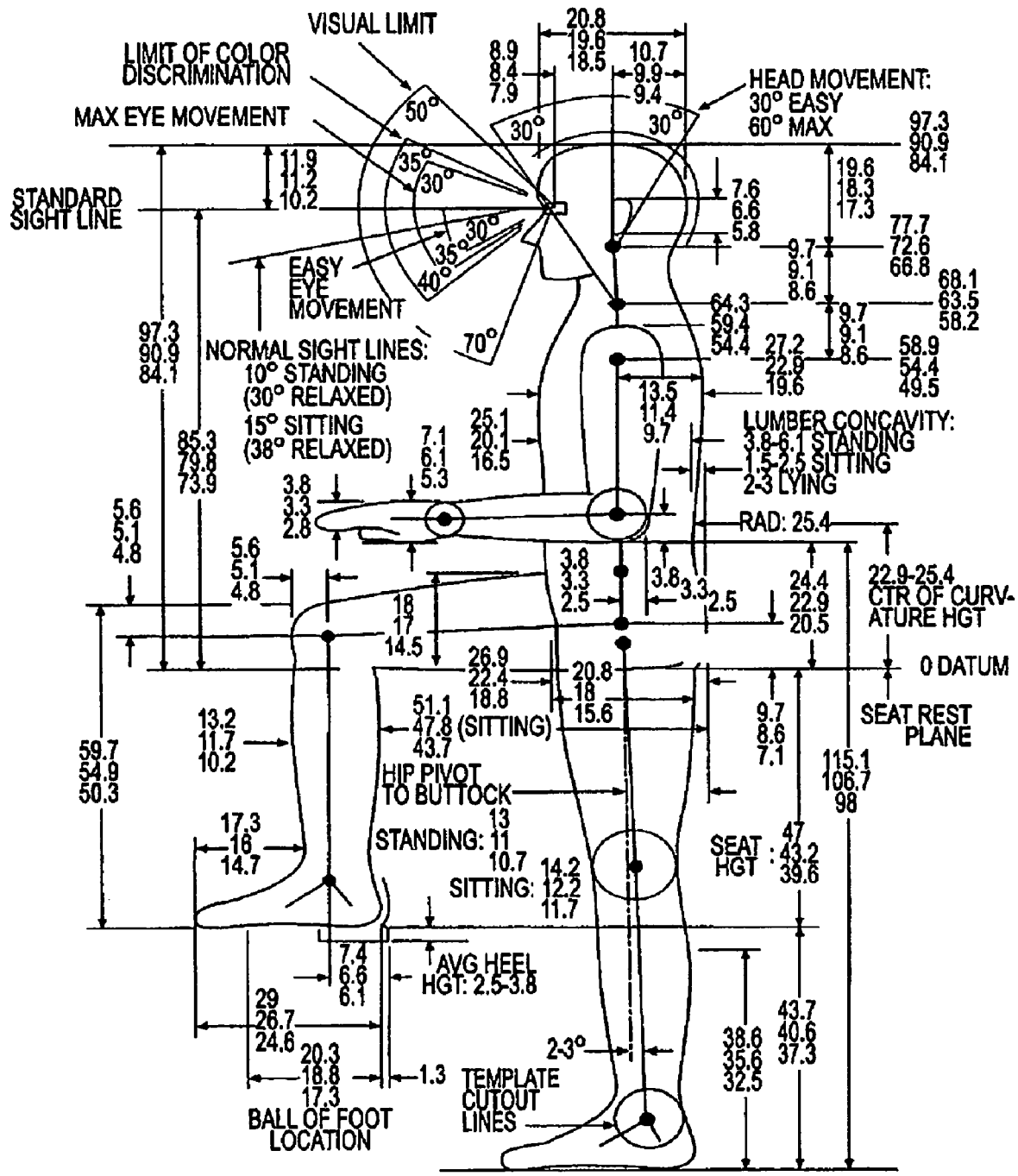

FIGS. 9 and 10 illustrate the various dimensions of a standard rider of the type depicted throughout the drawings. The standard rider is a $50^{th}$ percentile North-American adult male. All lengths in FIGS. 9 and 10 are in centimeters. The middle of each set of three dimensions represents the standard rider. The standard rider weighs 78 kgs. and has the body build illustrated in FIGS. 9 and 10. The dimensions of the standard rider are a "ruler" by which the dimensions of the various embodiments of the snowmobile of the present invention are measured. Riders 26, 28, 30 are standard riders.

The steering device 32, such as a handlebar, is positioned at the forward end of the snowmobile 10 above the engine 17. The steering device 32 has a steering position 34, which is defined by a center of a portion of the steering device adapted to be held by the hands of the rider 26. The steering position 34 is defined when the skis 16 are positioned straight-forward. For example, if the steering device 32 comprises handlebars (as illustrated in FIG. 2), the steering position 34 is the center of the grips of the handlebars.

While the steering device 32 is shown in the various figures as a handlebar, the steering device 32 should not be limited to just this particular construction. It would be understood by those skilled in the art that any suitable steering device 32 may be used for the snowmobile 10. For example, the steering device 32 could be a steering wheel or a yoke of the type used in aircraft. In accordance with the above definition of the steering position 34, if the steering device 32 is a steering wheel or yoke, the steering position 34 is the center of the steering wheel or yoke.

Moreover, the positioning of the steering device 32 above the engine 17 also should not be considered to be limited to the position illustrated in FIG. 2. As would be understood by those skilled in the art, depending on the particular arrangement of elements for the snowmobile 10, it is possible that the steering device 32 could be positioned higher or lower than shown in FIG. 2 without departing from the scope and spirit of the present invention.

A steering shaft 36 operatively connects the steering device 32 to the two skis 16 and is disposed over the engine 17 at an angle $\epsilon$ from vertical. The inventors altered the positioning of the axis of the steering shaft 36 so that it is more steeply sloped than steering shafts 136 in prior art snowmobiles 110 having steering shafts over the engine. According to the present invention, and as illustrated in FIGS. 2 and 8, the angle $\epsilon$ is less than 45°. More preferably, angle $\epsilon$ lies between about 25 and 40°. Even more preferably, angle $\epsilon$ lies between about 30 and 35°. Most preferably, angle $\epsilon$ is about 33°.

Because the steering device 32 is shifted forward, relative to the conventional snowmobile 110, the steering position 34 is disposed in front of the center of gravity 46 by a distance B. According to the first embodiment of the present invention shown in FIG. 2, distance B is greater than 0 and preferably between 105 mm and 155 mm.

A drive track 20, which is operatively connected to the engine 17, is positioned below the frame 14. The drive track 20 is a continuous belt that runs around a number of axles including a forward-most axle 44. The continuous belt has a 136-inch circumference in the first embodiment illustrated in FIG. 2, though the invention is in no way limited to a snowmobile with a particular belt size. The forward-most drive axle 44 is disposed behind the steering position 34 by a distance calculated as distance B minus distance A. According to the present invention, the forward-most drive axle 44 is disposed behind the steering position 34. Preferably, the distance is between 40 mm and 90 mm.

Two footrests are positioned on either side of seat 50 to accommodate the feet of the riders 26, 28. The footrests extend outwardly from the frame 14. The footrests may be disposed in a horizontal orientation, or alternatively, in an angled orientation.

An adjustable backrest 92 is attached to the seat 50 near the back end of the seat 50. Various embodiments of the backrest 92 are described throughout the specification, where preferred. As would be understood by those skilled in the art, the backrest 92 need not have only the construction shown or be located in the position depicted. In fact, the backrest 92 need not be provided at all.

The first seat position 52 is located behind the forward-most drive axle 44 by a horizontal distance calculated as distance D plus distance A. According to the present invention, this distance is less than 590 mm and preferably between 540 mm and 590 mm.

A second seat position 54 is disposed on the seat 50 behind the first seat position 52 and is adapted to accommodate a second rider 28 (first passenger) behind the driver 26 (first rider). As the rider 26 is positioned closer to the center of gravity 46 of the snowmobile 10 than on a conventional snowmobile 110, the ride for the second rider 28 on the snowmobile 10 is improved because the second rider 28 is also disposed closer to the center of gravity 46 of the snowmobile 10 (by comparison with a second rider 28 on a conventional snowmobile 110). The second seat position 54 is disposed a distance F behind the first seat position 52. According to this embodiment, distance F is between 315 mm and 365 mm. Preferably, distance F is between 325 mm and 355 mm.

In this embodiment, the first and second seat positions 52, 54 are disposed on the seat 50, which comprises an integral seat unit. The integral seat unit 50 may be rigidly mounted to the snowmobile 10 or it may be removably mounted.

A center of gravity 70 of the combined weight of the snowmobile 10 and rider 26 is disposed behind the center of gravity 46 of the snowmobile 10 without a rider. A center of gravity 72 of the combined weight of the snowmobile 10 and two riders 26, 28 is disposed farther rearward of the center of gravity 46. The first rider 26 has a center of gravity 27, which is positioned slightly forward of the rider's 26 torso because the rider's arms and legs are in a forwardly-extending position. Similarly, the second rider 28 has a center of gravity 29.

The center of gravity 29 of a second rider 28 on the snowmobile 10 is disposed behind the center of gravity 46 of the snowmobile 10 by a distance calculated as distance C plus distance E. This distance is preferably between 695 mm and 745 mm.

Figure 5:
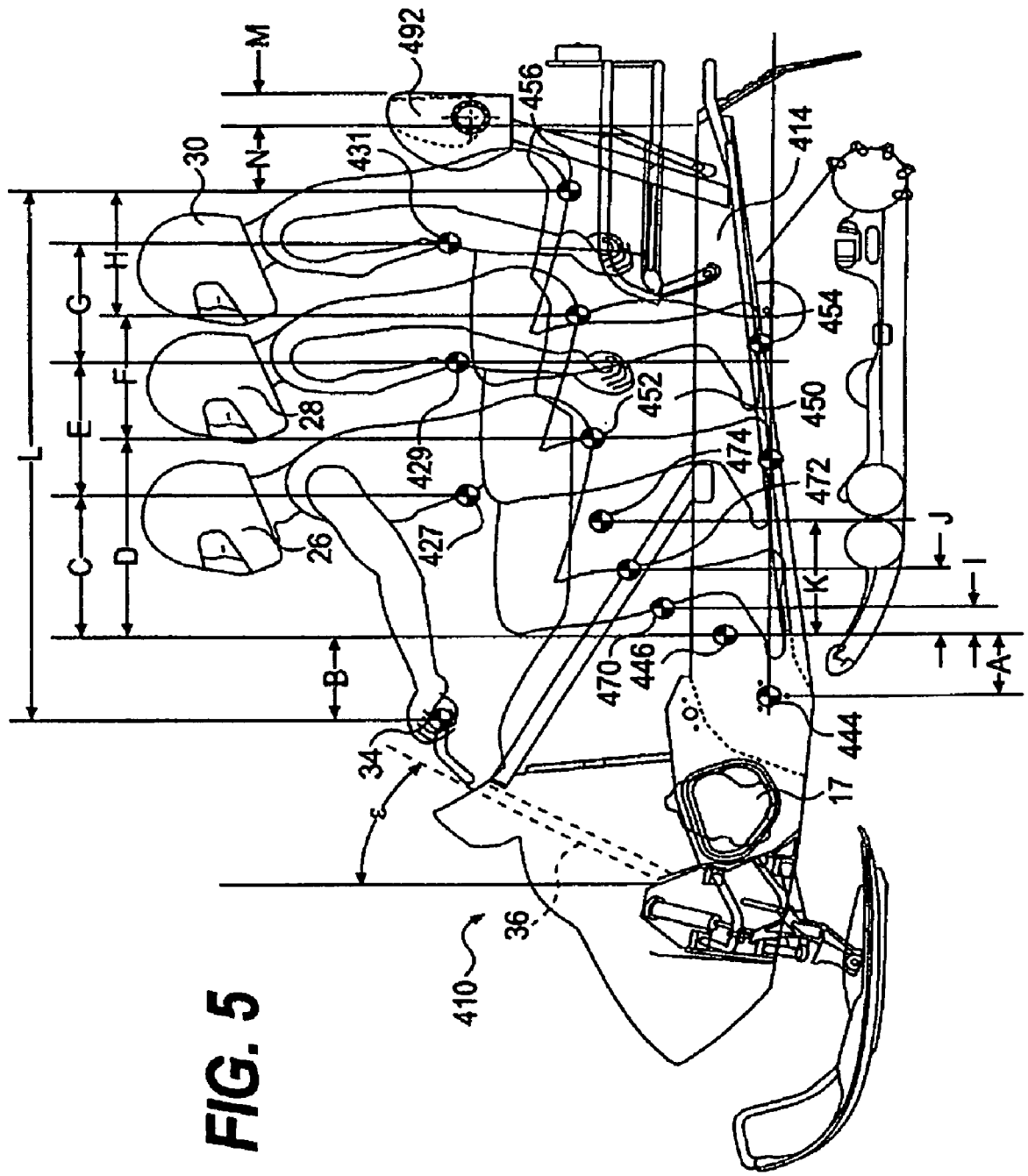
FIG. 5 is a side view illustration of a snowmobile according to a fourth embodiment of the present invention.
Figure 6:
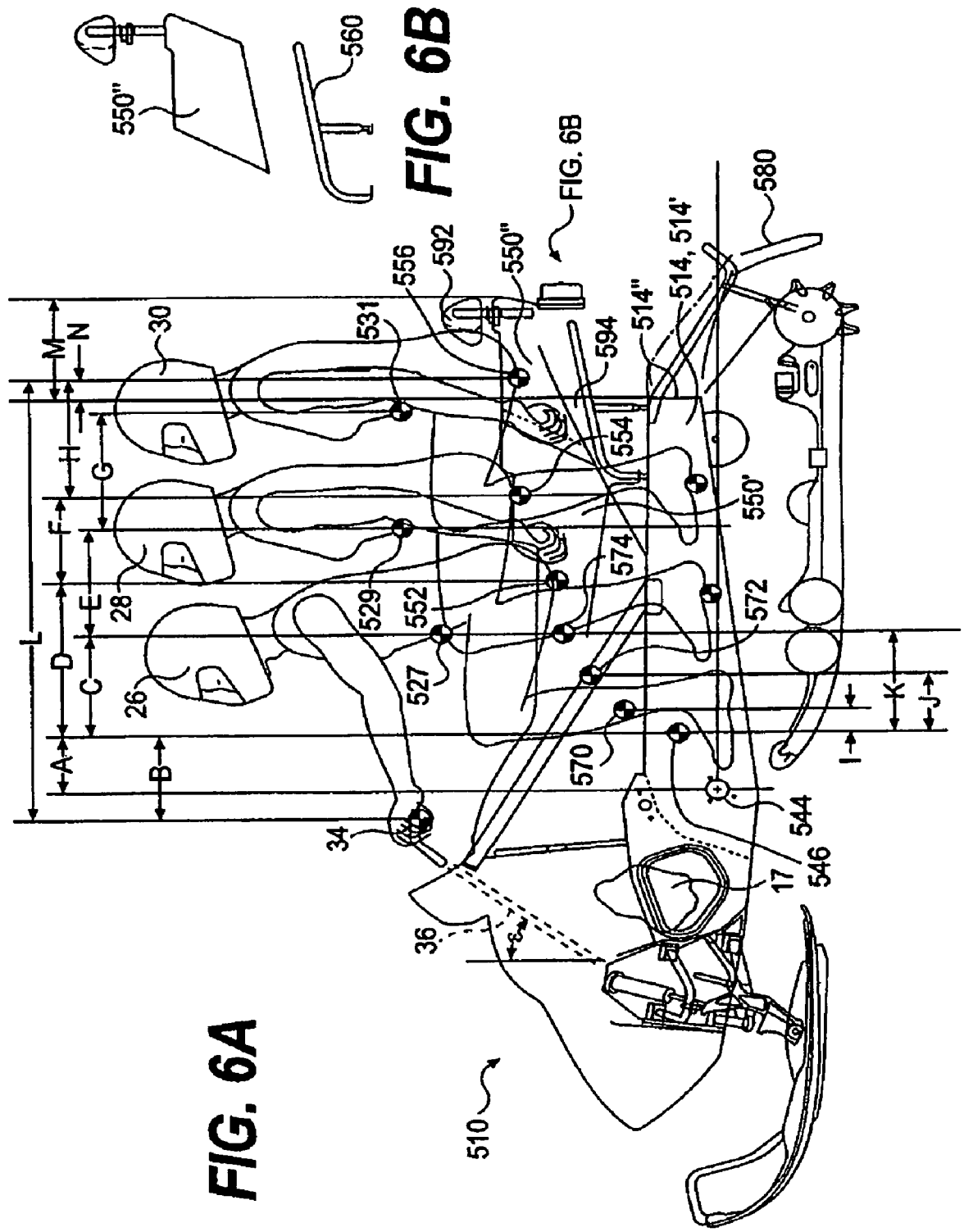
FIGS. 6A and 6B show side view illustrations of a snowmobile according to a fifth embodiment of the present invention.
Figure 7:
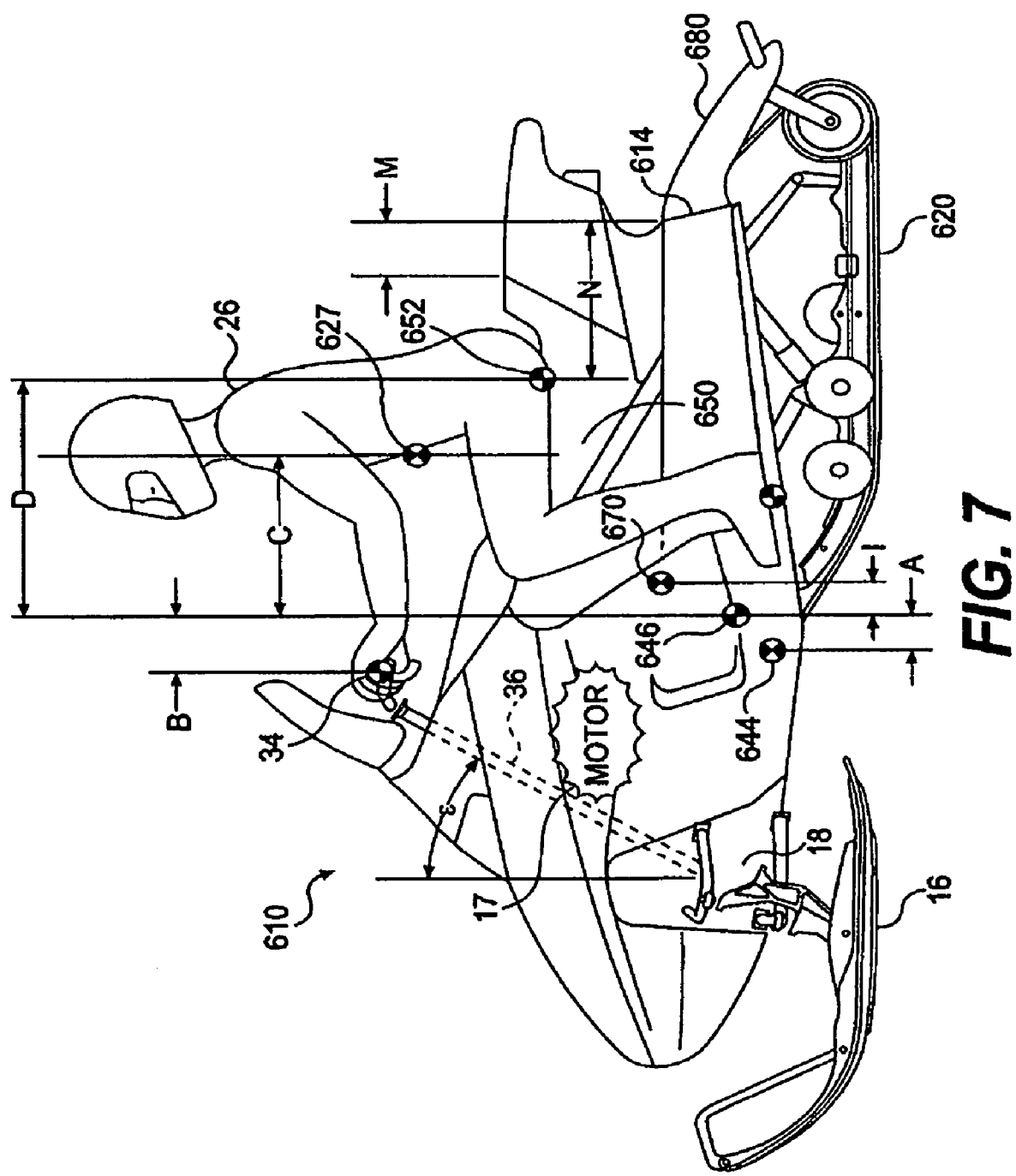
FIG. 7 is a side view illustration of a snowmobile according to a sixth embodiment of the present invention.

FIG. 5 illustrates a second embodiment of the present invention. Like the snowmobile 10 of the first embodiment, the snowmobile 410 has a long frame 414 and a 136 inch drive track 20.

As with the first embodiment, the axis of the steering shaft 36 forms an angle $\epsilon$ with vertical that is less than 45 degrees. Similarly, the angular position of steering shaft 36 permits placement of steering position 34 in a position forward of that for the conventional snowmobile 110, which moves the positions of the riders 26, 28 closer to the center of gravity 446 of the snowmobile 410 and improves the comfort of the riders 26, 28.

The forward-most drive axle 444 is disposed behind the steering position 34 by a distance calculated as distance B minus distance A. According to the present invention, the forward-most drive axle 444 is disposed behind the steering position 34. Preferably, the distance is between 40 mm and 90 mm.

Like the seat 50 of the first embodiment, the seat 450 of snowmobile 410 comprises an integral seat unit that may either be rigidly mounted to the snowmobile 410 or removable. A first seat position 452 is defined on the seat 450 behind the forward-most drive axle 444 by a horizontal distance calculated as distance D plus distance A. According to the present invention, this distance is less than 590 mm and preferably between 540 mm and 590 mm.

A second seat position 454 is disposed on the seat 450 a horizontal distance F behind the first seat position 452. According to this embodiment, distance F is between 315 mm and 365 mm.

A third seat position 456 is added behind the second seat position 454 on the seat 450 in order to accommodate a third rider 30. The forward placement of the steering position 34 permits a third rider 30 to ride the snowmobile 410 without experiencing prohibitively large jostling forces. The center of gravity 431 of the third rider 30 is positioned behind the center of gravity of snowmobile 410 by a distance calculated as distance C plus distance E plus distance 0, which is preferably between 900 mm and 950 mm.

A center of gravity 470 of the combined weight of the snowmobile 410 and rider 26 is disposed behind the center of gravity 446 of the snowmobile 410 without a rider. A center of gravity 472 of the combined weight of the snowmobile 410 and two riders 26, 28 is disposed farther rearward of the center of gravity 446 of the riderless snowmobile 410. A center of gravity 474 of the combined weight of the snowmobile 410 and three riders 26, 28, 30 is disposed even farther rearward of the center of gravity 446 of the riderless snowmobile 410. The first rider 26 has a center of gravity 427, which is positioned slightly forward of the rider's 26 torso because the rider's arms and legs are in a forwardly-extending position. Similarly, the second and third riders 28, 30 have centers of gravity 429, 431, respectively.

The center of gravity 427 of the first rider 26 on the snowmobile 410 is preferably between 220 mm and 270 mm behind the center of gravity 446 of the snowmobile 410.

The center of gravity 429 of a second rider 28 on the snowmobile 410 is disposed behind the center of gravity 446 of the snowmobile 410 by a distance calculated as distance C plus distance E. This distance is preferably between 590 mm and 640 mm.

The center of gravity 431 of the third rider 30 on the snowmobile 410 is disposed behind the center of gravity 446 of the snowmobile 410 by a distance calculated as distance C plus distance E plus distance G. This distance is preferably between 900 mm and 950 mm.

A horizontal distance H between the second seat position 454 the third seat position 456 is preferably between 285 mm and 335 mm. A horizontal distance G between the center of gravity 429 of the second rider 428 and the center of gravity 431 of the third rider 430 is about the same as distance H for this embodiment FIGS. 13-17 illustrate an additional alternative embodiment of the present invention Like the snowmobile 410 illustrated in FIG. 5, the snowmobile 1100 is designed to accommodate up to three riders (a driver and first and second passengers). Accordingly, a three-person straddle seat assembly 1110 is mounted to a frame 1120 of the snowmobile 1100.

Figure 13:
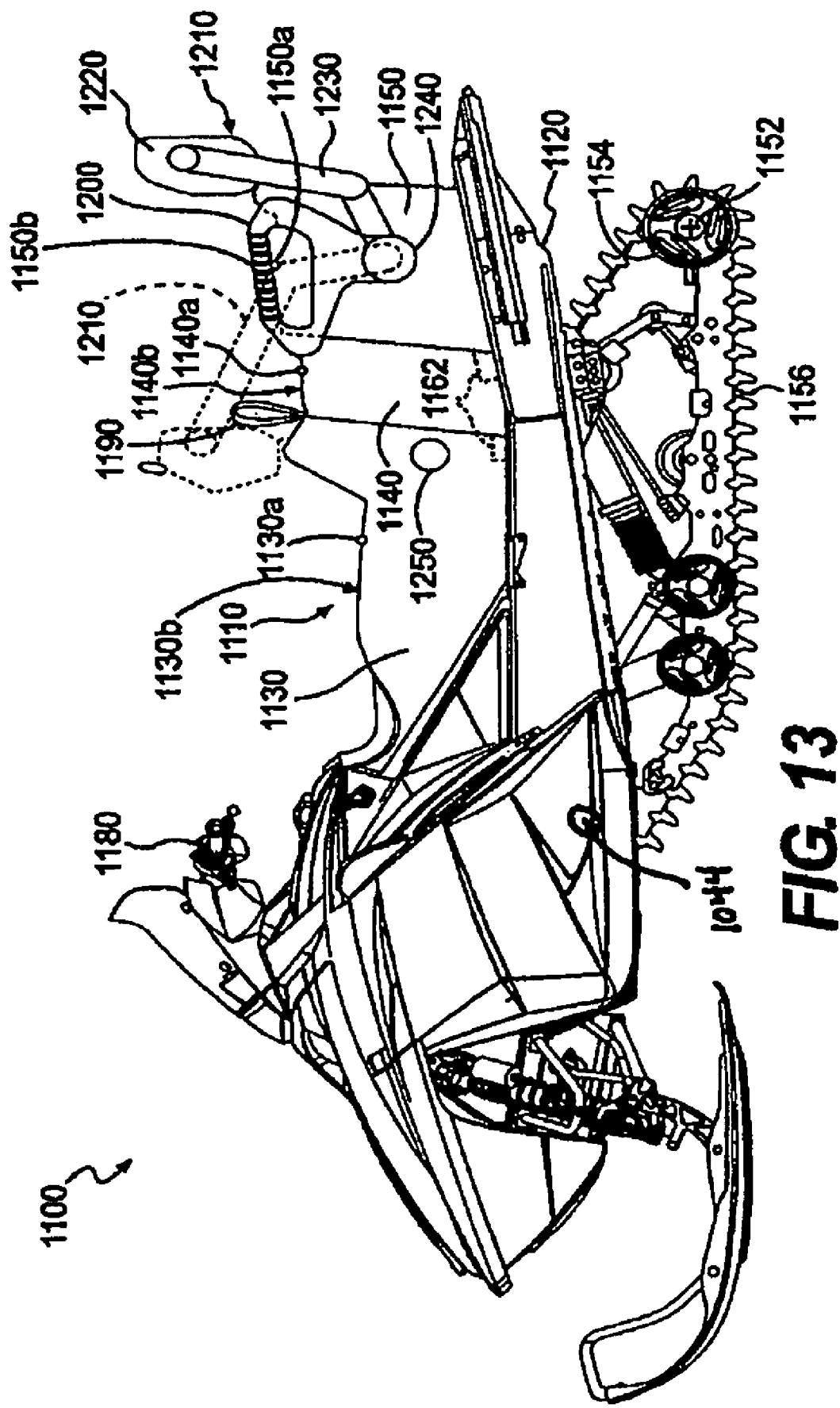
FIG. 13 is a side view of a three-person snowmobile according to a seventh embodiment of the present invention.
Figure 17:
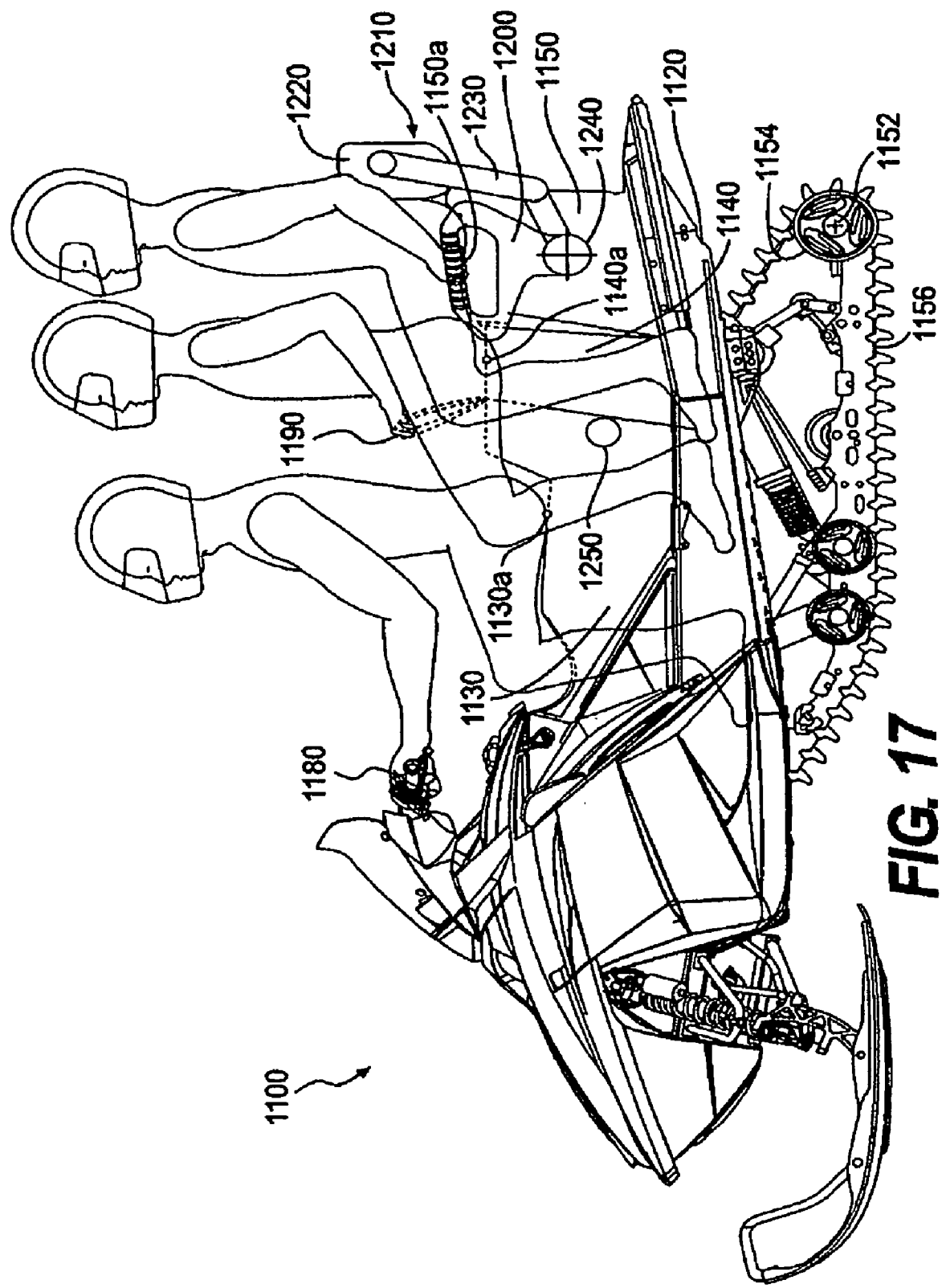
FIG. 17 is a side view of the snowmobile illustrated in FIG. 13 with three riders thereon.

FIGS. 13 and 17 illustrate a first configuration of the seat assembly 1110, which is specifically designed to accommodate 3 riders. The straddle seat assembly 1110 comprises distinct first, second, and third seat portions 1130, 1140, 1150 for the driver, first passenger, and second passenger, respectively. The seat portions 1130, 1140, 1150 define seat positions 1130a, 1140a, 1150a, respectively for the driver and the two passengers.

The seat position 1150a of the second passenger Is disposed forward of an axis 1152 of a rear idler wheel 1154 of an endless track 1156 of the snowmobile 1100. By placing the seat position 1150a forward of the rear idler wheel 1154, the skis of the snowmobile 1100 and the second passenger are disposed on the same side of the "see-saw" fulcrum created by the rear idler wheel 1154 so that the second passenger's weight does not lift the steering skis or impair the steerability of the snowmobile 1100. In conventional snowmobiles, on the other hand, if a third rider attempts to squeeze onto a snowmobile, his weight would be positioned behind the rear idler wheel and, disadvantageously, would tend to lift the skis from the ground or reduce the steering force applied by the skis due to the fact conventional snowmobiles were not designed to carry three riders.

Figure 13A:
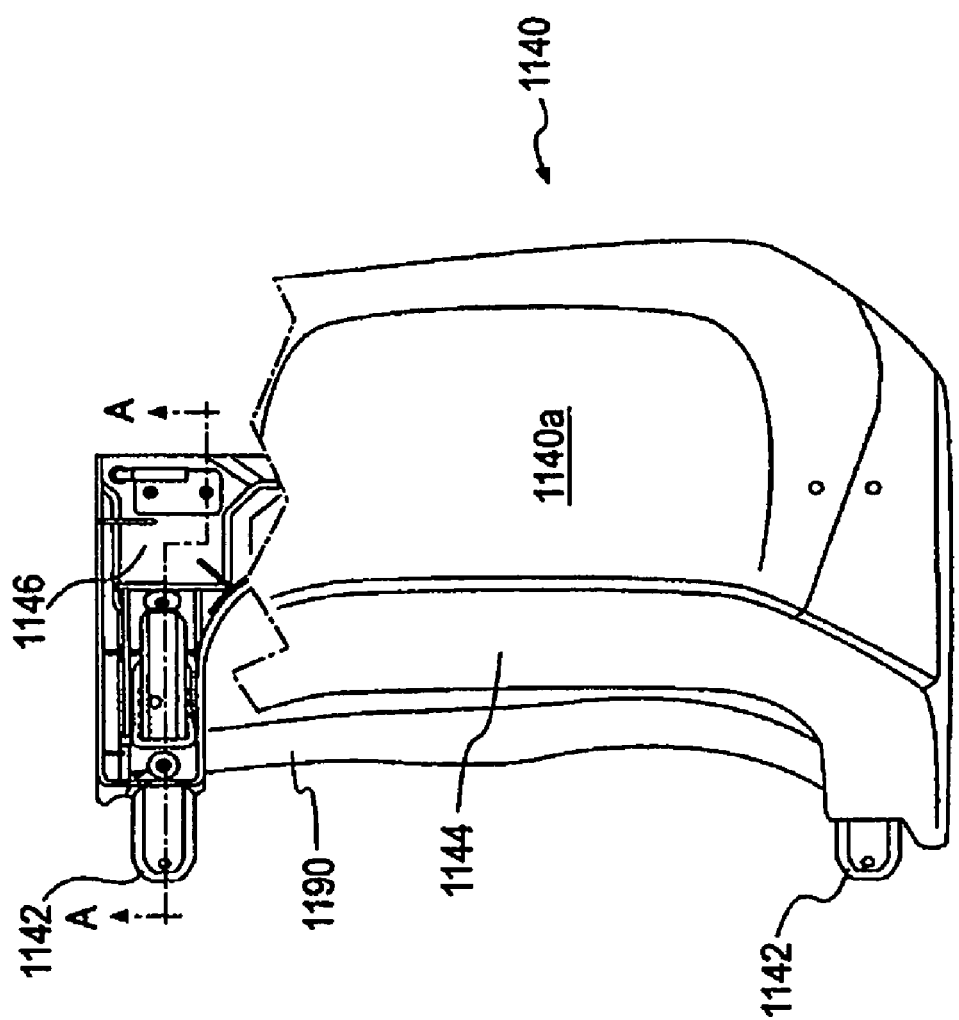
FIG. 13A is a top view of the second seat with a portion of the seat cut away to illustrate internal components.
Figure 13B:
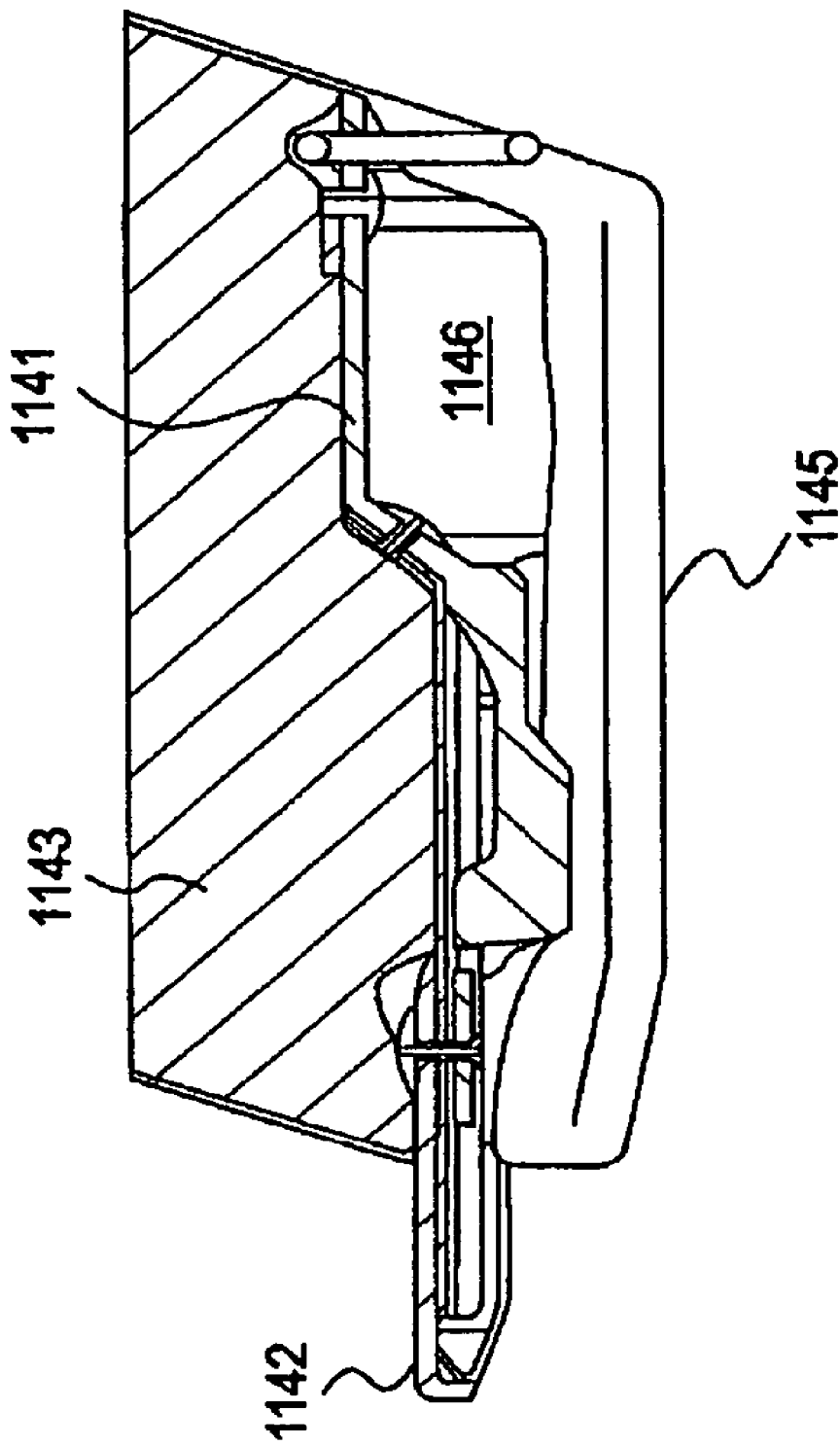
FIG. 13B is a cross-section of the second seat along A-A shown in FIG. 13A.

Second seat portion 1140 is shown in greater detail in FIGS. 13A and 13B. Seat portion 1140 comprises a base 1141, preferably made from plastic or light weight metal and foam 1143 placed on top of the base 1141. The top portion of foam 1143 defines seat position 1140a where a rider will be seated. A flexible, preferably waterproof cover will cover the foam 1143 and attach to the base 1141 to hold the foam and base together as a single unit. Base 1141 further includes tongues 1142 extending forwardly from the front of the base 1141. Tongues 1142 are used to secure seat 1140 to the first seat portion 1130 as will be described in greater detail below. Base 1141 also includes cavities 1146 situated toward the rear of the base 1141. Cavities 1146 serve to accept tongues 1152 of seat 1150 shown in FIGS. 13C and 13D. In the preferred embodiment, two cavities are used to accept two tongues of the seat placed behind it, it will be appreciated that one or more than two tongues and cavities could be used.

Figure 13D:
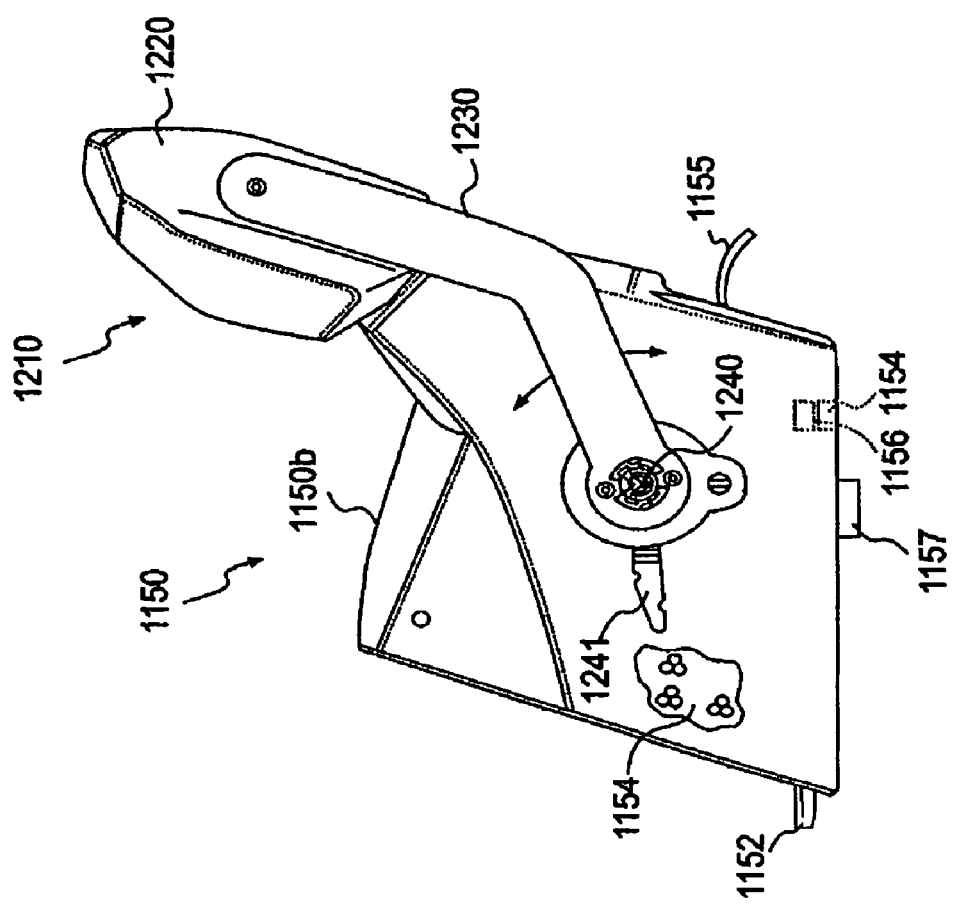
FIG. 13D is a side view of the third seat portion of FIG. 13C.
Figure 13E:
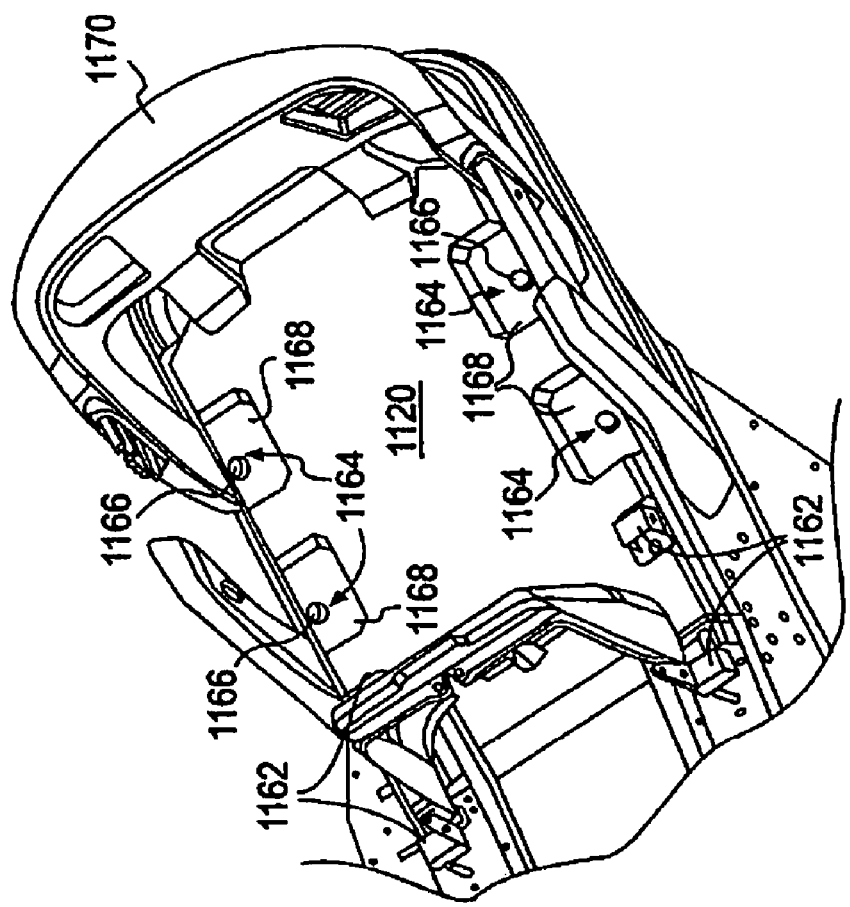
FIG. 13E is a top view of a portion of the rear of the tunnel including mounting pins.

Best seen in FIG. 13E the tunnel 1120 has two holders 1162, one on the right-hand side of the tunnel and one on the left-hand side of the tunnel, to accept tongues 1142 and/or 1152 of the second and third seat portions 1140 and/or 1150 respectively. The two forward-most holders 1162 are preferably situated on the tunnel 1120 such that they coincide with the rear bottom corners of the first seat portion 1130 and second seat portion 1140 best shown in FIG. 13. When the second seat portion 1140 is to be attached to the snowmobile 1100, the bottom surface 1145 of second seat portion 1140 is placed on top of frame/tunnel 1120 such that the tongues 1142 are aligned with the two forward-most holders 1162. The seat 1140 is then pushed forward until surface 1144 of the second seat portion 1140 contacts the first seat portion 1130. The bottom surface 1145 of the second seat portion 1140 further includes cavities 1146 which accept the rear-most holders 1162 and permit the second seat portion 1140 to lie flat onto the tunnel 1120. In order to prevent the second seat portion from moving rearward relative to the first seat portion, a third seat portion 1150 is attached to top of the tunnel 1120 behind the second seat portion 1140 as will be described in greater detail below.

Figure 14:
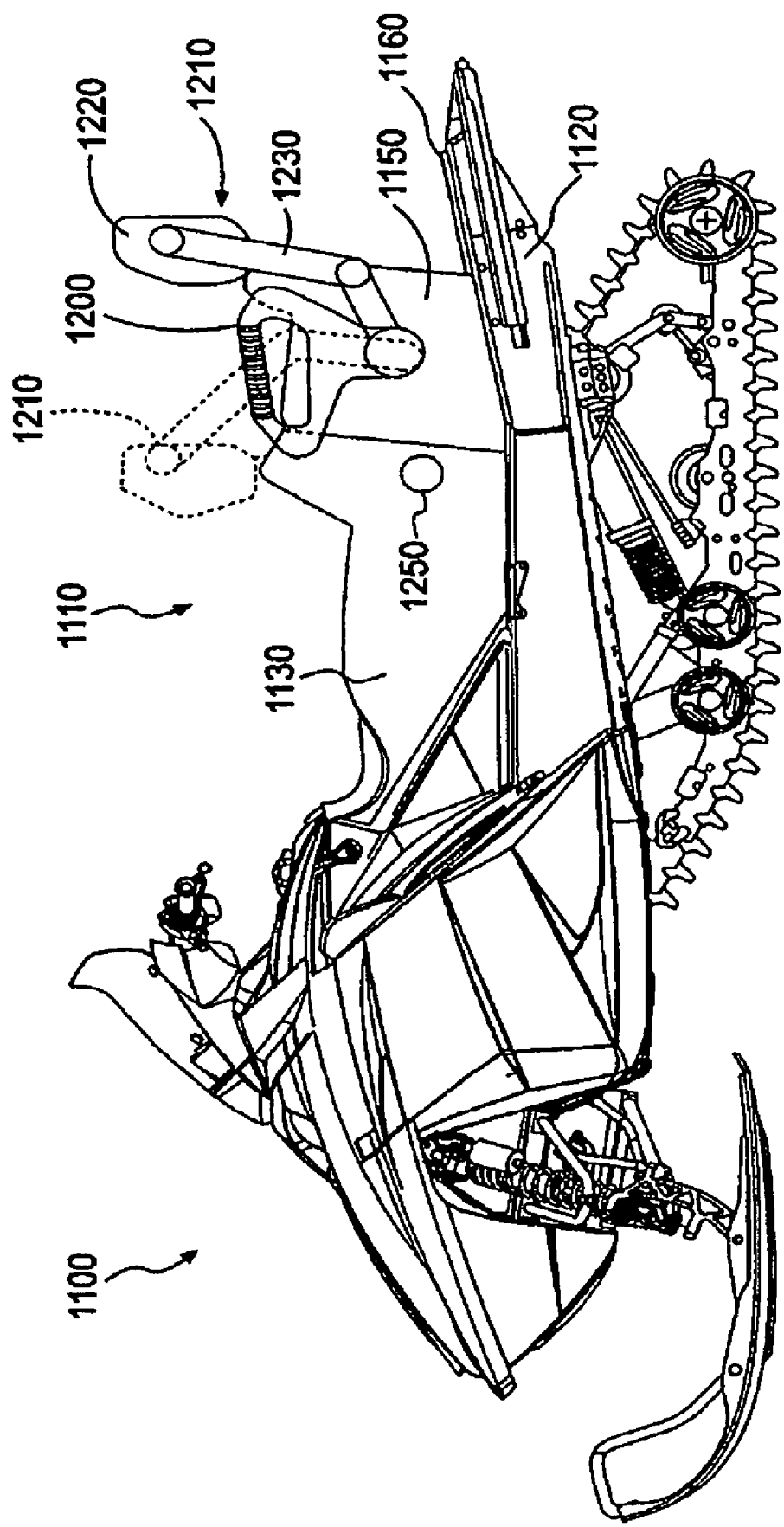
FIG. 14 is a side view of the snowmobile illustrated in FIG. 13 in a two-person seat configuration.

Also shown in FIG. 13E are pins 1164 which are used to attach the third seat portion 1150 to the tunnel 1120 in a manner described below. The preferred embodiment uses two laterally spaced pins to attach the seat in each of the two positions, i.e. when the third seat portion 1150 is placed directly behind the first seat portion 1130, the two forward-most pins 1164 are used, when the third seat portion 1150 is placed behind the second seat portion 1140, which is itself placed behind the first seat portion 1130, the two rear-most pins 1164 are used. It would be appreciated that one or more than two pins could be used to secure the seat portion to the tunnel. The pins 1164 have a circular shaft (not shown) with an enlarged head portion 1166. The pins 1164 are preferably placed in indentations 1168 within the tunnel 1120 such that the enlarged heads 1166 do not protrude beyond the upper surface of the tunnel and interfere with any cargo placed in that area when the seat portions are not being used. A cargo rack 1170 is also placed on the tunnel 1120 to prevent cargo from falling off the tunnel 1120. The cargo rack 1170 could also be used to support additional accessories or the passenger hand grips 1200 such as is shown in FIG. 14.

FIGS. 13C and 13D illustrate further aspects of the third seat portion 1150. Third seat portion 1150 comprises a base 1153, preferably made of plastic or a lightweight metal, and foam 1154 placed above the base 1153. A flexible, preferably waterproof cover will cover the foam 1154 and attach to the base 1153 to hold the foam and base as a single unit. The top surface of foam 1154 defines the seating surface 1150*b*. As discussed above, third seat portion 1150 also includes two tongues 1152 extending forwardly from the base 1153. Base 1153 further includes two apertures 1154 toward the rear bottom corners of the base 1153 as can be seen in FIGS. 13C and 13D. Apertures 1154 are provided to accept mounting pins 1164 shown in FIG. 13E.

Base 1153 also includes a latch mechanism for holding and releasing the third seat portion 1150 to the tunnel 1120. The latch mechanism uses a strap 1155, extending from the rear of the seat 1150 and connected to a piece of wire 1156, which, when the seat is installed onto the tunnel 1120, engages the enlarged portions 1166 of the mounting pins 1164 preventing the seat from being pulled away from the tunnel 1120. Wire 1156 is shaped such that it passed through at least a portion of the aperture 1154. When strap 1155 is pulled, the wire is flexed away from the aperture 1154, disengaging the pins 1164 and allowing the seat to be removed from the tunnel.

It is to be understood, that, in order to install the third seat portion 1150 to the top of the tunnel 1120 behind the second seat portion 1140, or behind the first seat portion 1130, one would slightly tip the seat toward the front, insert the tongues 1152 into cavities 1162 and proceed to push the rear of the seat toward the tunnel until pins 1164 are inserted into apertures 1154 and wire 1156 has flexed and passed over the enlarged top portion 1166 of the pins 1164 securing the seat to the tunnel 1120. The second seat portion 1140, when in used, relies on its tongues 1142 inserted into the two forward-most cavities 1162 and the tight fit with between the first seat portion and the third seat portion to keep it in place. As would be appreciated by one skilled in the art, a similar attachment system including the pins and flexible wire explained for the third seat portion 1150 could be used to attach the second seat portion 1140 to the tunnel 1120 without deviating from the present invention.

In the preferred embodiment, the second seat portion 1140 can only be installed if the third seat portion 1150 has been removed from the tunnel 1120. It is contemplated that the second seat portion, without the tongues 1142, could be used and simply inserted between the first seat portion 1130 and the third seat portion 1150 (also without tongues 1152) and rely on a tight fit between the two seats to prevent the second seat portion 1140 from being inadvertently removed from the tunnel 1120.

Base 1153 of the third seat portion 1150 further includes rubber bumpers 1157. Bumpers 1157 make contact with the top surface of the tunnel 1120 when the third seat portion 1150 is attached to the tunnel 1120. Bumpers 1157 are sized such that they are compressed between the seat and the tunnel once the seat is installed onto the tunnel, thus pushing the seat vertically away from the tunnel creating constant contact between the wire 1156 and the enlarged portion 1166 of pins 1164, eliminating any small vertical movements between the seat and the tunnel when the rider is not seated on the seat. It would be understood that the force created by the bumpers 1157 would be insufficient to cause the wire 1156 to disengage the enlarged portions 1166 such that the third seat portion is inadvertently forced away from the tunnel.

To facilitate comfortable seating of all three riders, a surface 1130*b* of a seat defined by the first seat portion 1130 is preferably disposed below a surface 1140*b* of a seat defined by the second seat portion 1140. The surface 1140*b* is preferably disposed below or at the same height as a surface 1150*b* of a seat of the third seat portion 1150.

FIG. 14 illustrates a second configuration of the seat assembly 1110, which is designed to accommodate 2 riders, (a driver and one passenger). As may be appreciated from the discussion that follows, the second configuration of the seat assembly 1110 presents a variation on the configuration depicted in FIG. 13.

So that these two configurations are possible, each seat portion 1130, 1140, 1150 is individually mounted to the frame 1120. The first seat portion 1130 is mounted to the frame 1120. The second seat portion 1140 is selectively detachable from the frame 1120. The third seat portion 1150 is movably attached to the frame 1120 for selective positioning in a rearward position (see FIG. 13) and a forward position (see FIG. 14). Accordingly, when the second seat portion 1140 is detached from the snowmobile 1100, the third seat portion 1150 may be selectively moved forward to abut against the first seat portion 1130. In this second seat assembly 1110 configuration, the driver is supported by the first seat portion 1130 and a first passenger is supported by the third seat portion 1150. For this configuration, a storage space 1160 is provided behind the third seat portion 1150 and above the frame 1120 in the space created by moving the third seat portion 1150 forward.

Figure 15:
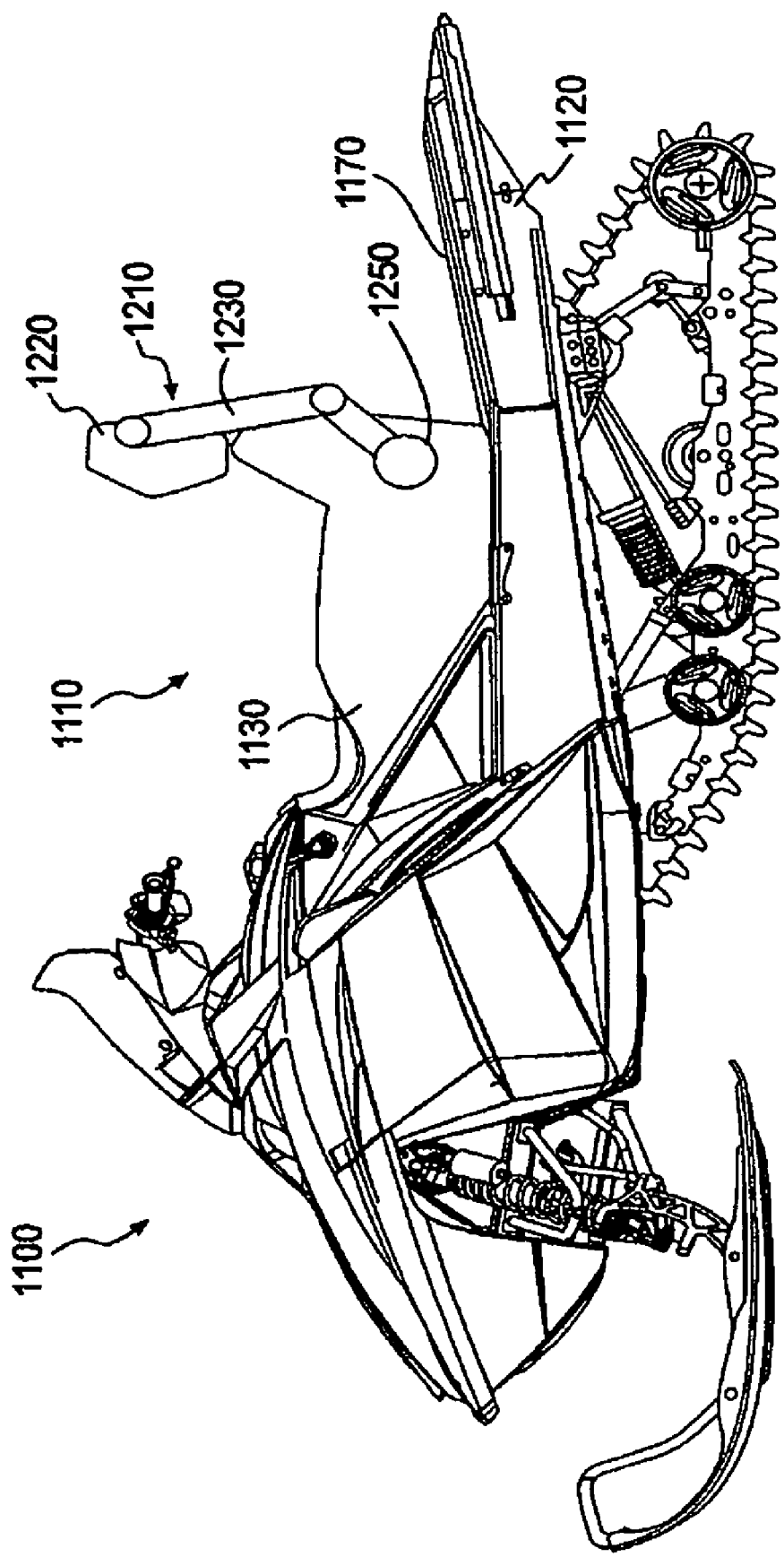
FIG. 15 is a side view of the snowmobile illustrated in FIG. 13 in a one-person seat configuration.

FIG. 15 illustrates a third seat assembly 1110 configuration which is designed to accommodate one rider. In addition to being movably attached to the frame 1120, the third seat portion 1150 is also detachably mounted to the frame 1120. Accordingly, when both the second and third seat portions 1140, 1150 are detached, the seat assembly 1100 provides support for one rider via the first seat portion 1130. A large storage space 1170 is provided behind the first seat portion and above the frame 1120 in the space that is no longer occupied by the second and third seat portions 1140, 1150.

FIG. 13D also shows backrest assembly 1210 mounted to the third seat portion 1150 through the mounting points 1240. Mounting points 1240 allow the backrest assembly 1210 to pivot with respect to the third seat portion 1150 in the direction of the arrows. A lever, 1241, when rotated counterclockwise, engages a release mechanism (not shown) which allows the spring to bias the backrest 1220 toward the front. When lever 1241 is rotated clockwise, the release mechanism prevents further movement of the backrest 1220 relative to the third seat portion 1150. This allows the passenger to adjust the positioning of the backrest 1220 to a comfortable position. Lever 1241 may also be spring biased to a position which prevents the backrest 1220 from any movement with respect to the third seat portion 1150.

Figure 16:
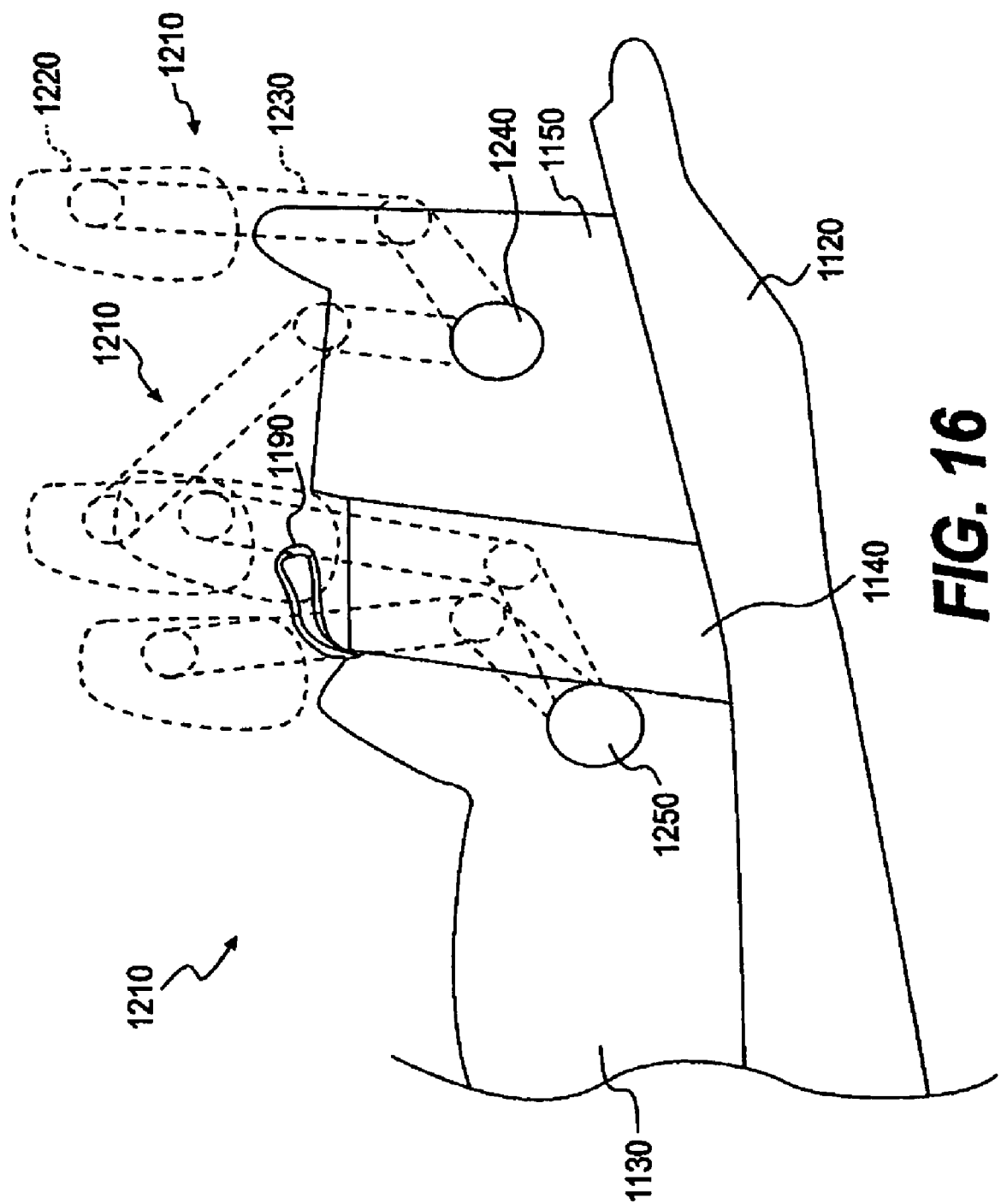
FIG. 16 is a partial side view of the snowmobile illustrated in FIG. 13.

As illustrated in FIGS. 13, 13D, and 14, a backrest assembly 1210 mounts to the third seat portion 1150. The backrest assembly 1210 includes a cushioned backrest 1220 connected to an adjustable backrest mount 1230. The third seat portion 1150 includes backrest mounting points 1240 on its left and right sides. The backrest mount 1230 has left and right arms that extend downwardly from the cushioned backrest 1220 and are constructed and arranged to adjustably and detachably mount to the backrest mounting points 1240 of the third seat portion 1150. As illustrated in FIG. 16, the backrest mount 1230 selectively pivotally connects to the mounting points 1240 to enable the position of the backrest 1220 to be adjusted. The backrest mount 1230 may include one or more internal backrest 1220 adjustment mechanisms, e.g., pivotal connections, telescopic connections, etc. The backrest assembly 1210 can therefore be adjusted for use by the first or second passenger.

While only the extreme positions of the backrest assembly 1210 are illustrated, the backrest assembly 1210 is preferably selectively positionable in a variety of intermediate and more extreme positions. For example, as illustrated in dotted lines in FIG. 13, the backrest assembly 1210 may be attached to the third seat portion 1150 and pivoted forward enough that the driver may use the backrest 1220 for back support. Similarly, as illustrated in dotted lines in FIG. 14, when the second seat portion 1140 is removed, the backrest assembly 1210 may also be adjusted to provide back support for the driver sitting on the first seat portion 1130.

As illustrated in FIGS. 13, 15, and 16, the first seat portion 1130 also has left and right backrest mounting points 1250. As illustrated in FIG. 15, when the third seat portion 1150 is not used, the backrest assembly 1210 may be detached from the mounting points 1240 and attached to the mounting points 1250 so that the back rest 1220 may be used by the driver. As illustrated in FIG. 16, when attached to the mounting points 1250, the backrest assembly 1210 may also be pivoted rearwardly enough to provide back support to a first passenger. Also illustrated in FIG. 16, backrest assembly 1250 selectively pivotally connects to the backrest mounting points 1260 on the second seat portion 1140.

Although the second and third seat portions 1140, 1150 in this embodiment are independently detachable from the frame, various other seat assembly configurations are within the scope of the present invention. For example, all three seat portions 1130, 1140, 1150 could be integrally formed or permanently attached to each other. Such a combination of seat portions 1130, 1140, 1150 could be permanently attached to the frame or removably attached to the frame. Alternatively, the first and second seat portions 1130, 1140 could be integrally formed with each other such that just the third seat portion 1150 would be detachable.

As illustrated in FIGS. 13 and 17, various hand holds are preferably provided on the seat assembly 1110 to help the riders secure themselves in their positions on the snowmobile 1100. The driver remains secure on the seat assembly 1110 because he holds the steering device 1180 (such as handlebars) with his/her hands.

The first passenger holds onto a looped strap 1190 that is mounted to the second seat portion 1140. When the first passenger rests on the second seat portion 1140, the looped strap 1190 is disposed between his/her legs and is positioned to enable the first passenger to hold onto the looped strap 1190 with his/her hands. In the illustrated embodiment, the looped strap 1190 comprises a looped piece of fabric webbing. However, various other types of hand holds could alternatively be provided for the first passenger. For example, flexible rubber or plastic handles could be mounted to the forward middle portion of the second seat portion 1140. Alternatively, grab handle(s) could be formed in the second seat portion 1140. Hand holds for the first passenger could alternatively be attached to or formed in a back end of the first seat portion 1130.

Since the looped strap 1190 is mounted on the second seat portion 1140, detachment of the second seat portion 1140 from the snowmobile 1100 also detaches he looped strap 1190 from the snowmobile 1100. Of course, in the alternative, the looped strap 1190 could be attached to the rear of the first seat portion 1130 without deviating from the scope of the present invention.

In the embodiment illustrated in FIG. 17, left and right grab handles 1200 (only the left grab handle is shown) mount to the left and right sides of the third seat portion 1150. The grab handles 1200 extend upwardly above the surface 1150b of the seat of the third seat portion 1150 to enable the second passenger to easily grab the handles 1200 with his/her hands without having to strain his/her arms. The grab handles preferably comprise blow-molded plastic or rubber that is relatively flexible. Such grab handles are preferably of the type described in U.S. patent application Ser. No. 10/361,682, filed Feb. 11, 2003, titled "QUICK RELEASE PASSENGER SEAT WITH FLEXIBLE GRAB HANDLE", which is incorporated by reference herein in its entirety. In the alternative, as would be appreciated by those skilled in the art, the grab handles 1200 may not be attached to the third seat portion 1150. Alternatively, a strap, such as the looped strap 1190, may be attached thereto.

Figure 18:
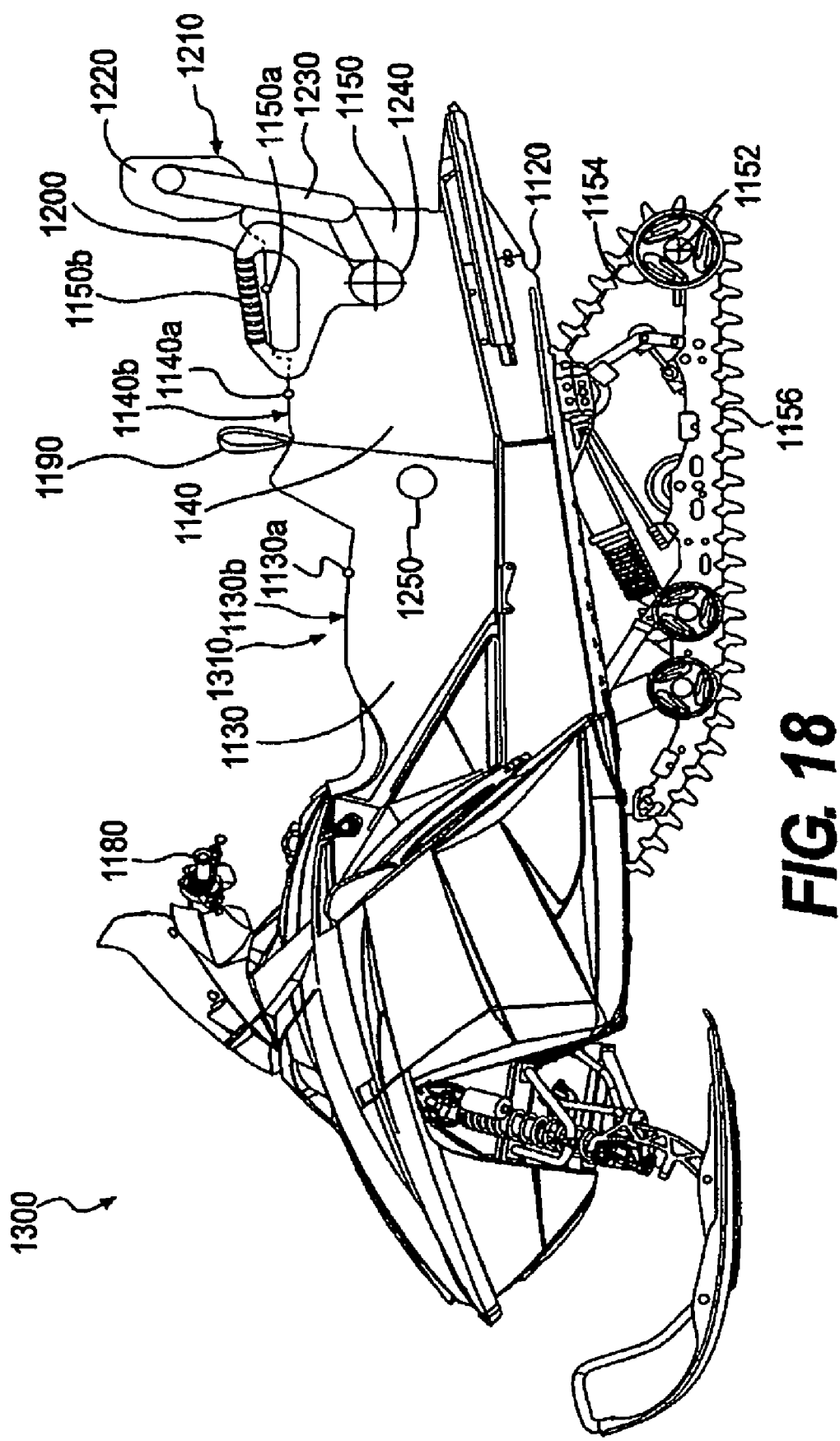
FIG. 18 is a side view of a three-person snowmobile according to an eighth embodiment of the present invention.

FIG. 18 illustrates yet another alternative embodiment of a snowmobile according to the present invention. The snowmobile 1300 is identical to the snowmobile 1100 illustrated in FIG. 13 except for an alternative seat assembly 1310. The seat assembly 1310 is identical to the seat assembly 1110 illustrated in FIG. 13 except that the second and third seat portions 1140, 1150 are integrally formed with (or otherwise permanently attached to) each other. The second and third seat portions 1140, 1150 can therefore be simultaneously detached from frame 1120 to create a storage space behind the first seat portion 1130. To use the seat assembly 1310 in a two rider configuration, the combined second and third seat portions 1140, 1150 are removed and a separate additional third seat portion 1150 is attached to the frame 1120 behind the first seat portion (see FIG. 14).

Figure 19:
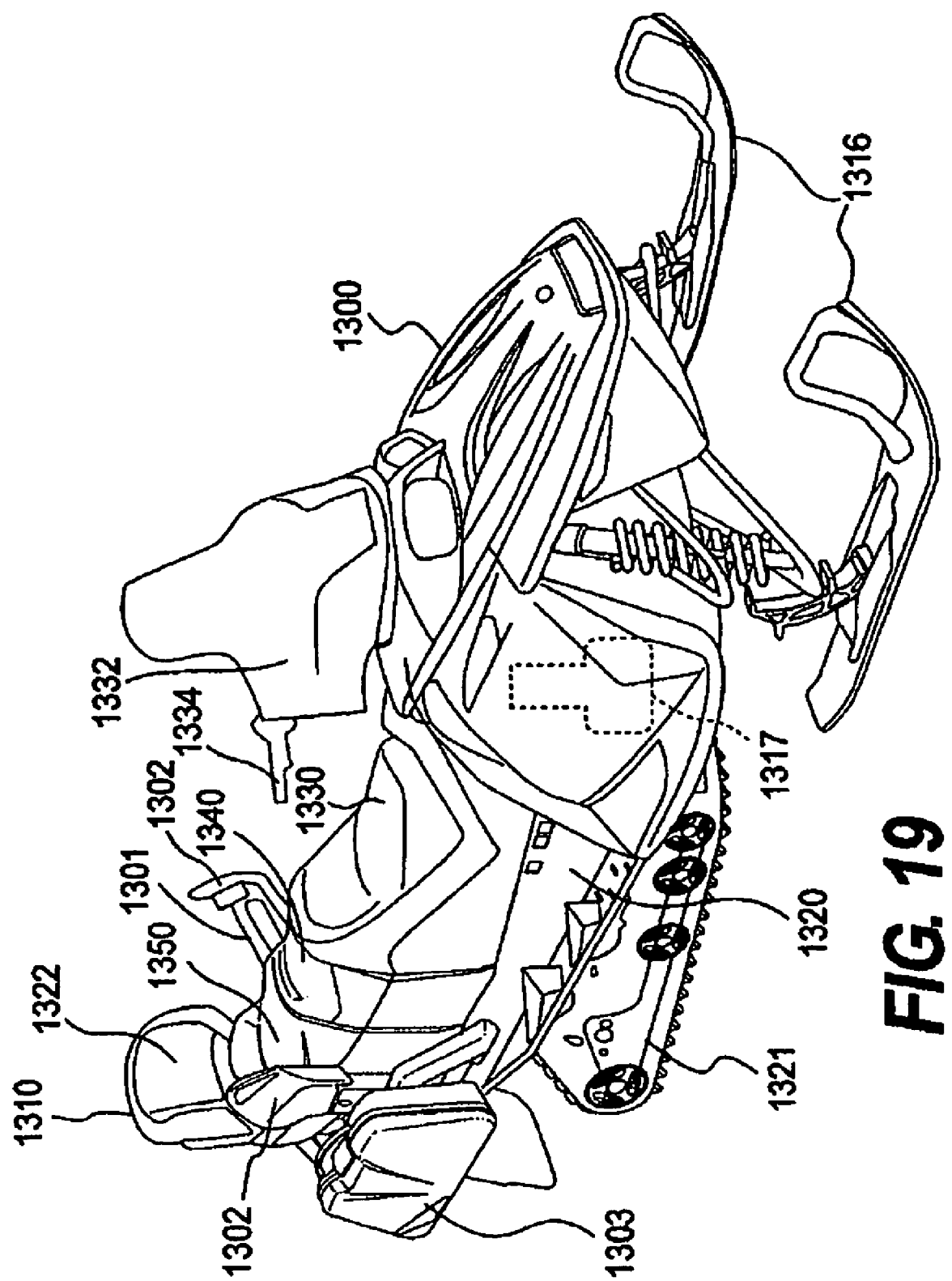
FIG. 19 is the commercial embodiment of the snowmobile of the present invention.

FIG. 19 shows a commercial embodiment of the present invention. Snowmobile 1300 is very similar to snowmobile 1100 shown in FIG. 14. Snowmobile 1300 has a frame 1320, an engine 1317 disposed on the frame 1320, a drive track 1321 disposed below the frame 1320 and operatively connected to the engine 1317. A straddle seat assembly 1310 is disposed on the flame 1320 rearward of the engine 1317 and two front skis 1316 are disposed forward of the engine 1317. Handlebars 1332 are operatively connect to the two front skis 1316 for steering the snowmobile 1300.

The straddle seat assembly 1310 is very similar to that of seat assembly 1110 shown in FIGS. 13-18 in that it comprises a first seat portion 1330, a second seat portion 1340 and a third seat portion 1350. Seat assembly 1310 also includes a back rest 1320 pivotally connected to the third seat portion 1350. Backrest 1322 pivotally connects to the third seat portion 1350 in the same manner as described above with respect to backrest 1220 and third seat portion 1150. Backrest 1322 is spring biased (not shown) toward the front of the seat as described above with respect to backrest 1220. Also shown in FIG. 19, handgrips 1301 and wind deflectors 1302 are provided on left and right sides of the third seat portion 1350. Cargo boxes 1303 may also be attached to the right and left sides of the third seat portion 1350 to provide extra storage space when travelling with all three seat portions.

Figure 20:
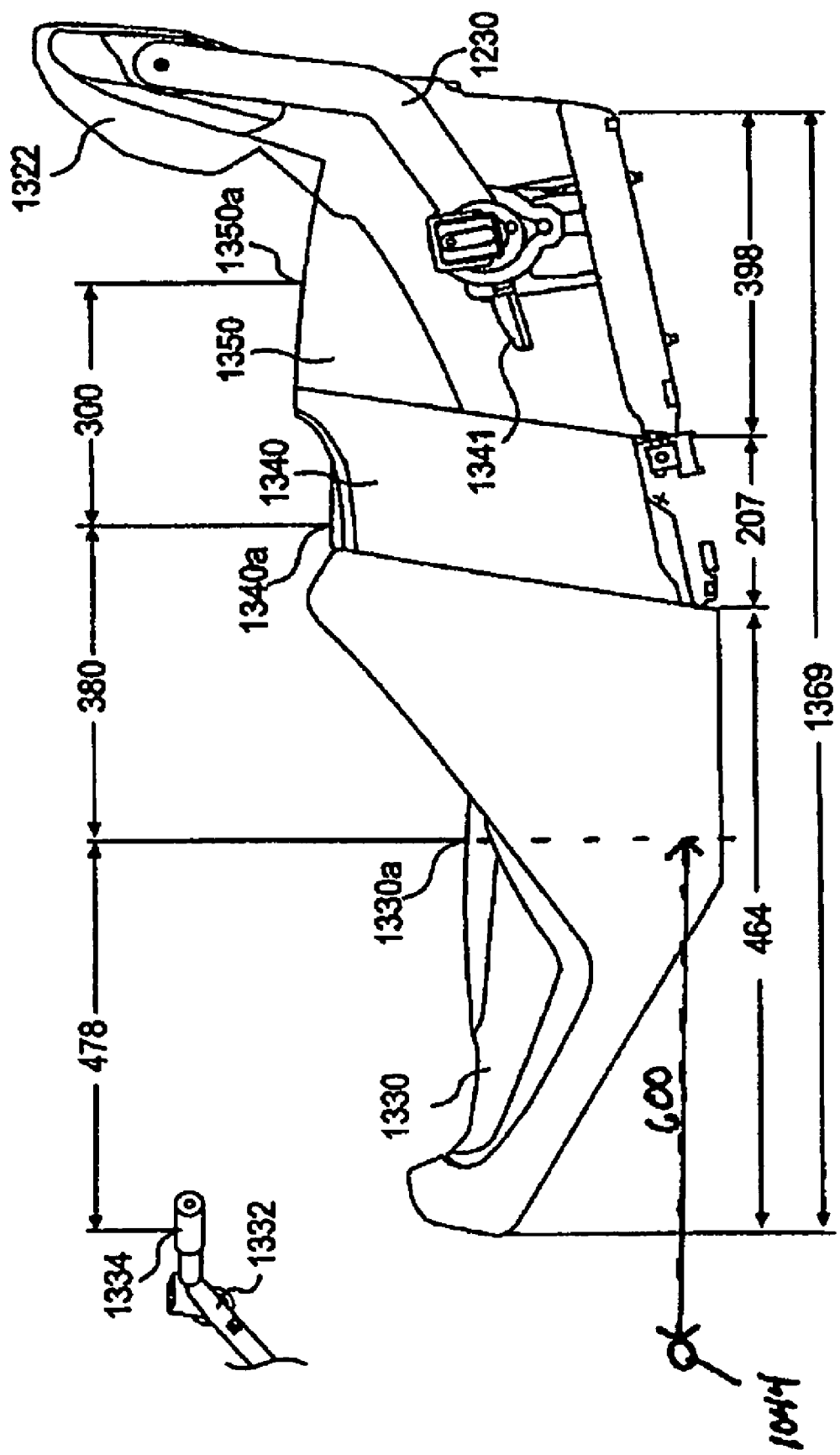
FIG. 20 is a side view of the seat shown in FIG. 19 showing the dimensions of the various seat portions.

FIG. 20 shows the preferred dimensions of the first, second and third seat portions 1330, 1340, and 1350 respectively. First seat portion 1330 is approximately 764 mm+/−50 mm in length. The second seat portion is approximately 207 mm+/−50 mm in length and the third seat portion is approximately 398 mm in length. The first seating portion has a first seating position 1330a, which is approximately 478 mm+/−50 mm from the steering position 1334 and approximately 600 mm+/−50 mm from the front drive axle 1044. The second seat portion has a second seating position 1340a which is approximately 380 mm+/−50 mm behind the first seating position 1330a and the third seat portion 1350 has a third seat position 1350a which is approximately 300 mm+/−50 mm behind the second seating position 1340a. The total length of the seat assembly 1310 comprising first, second and third seat portions 1330, 1340, and 1350 is 1369 mm+/−150 mm.

While the invention has been described with reference to the various exemplary embodiments outlined above, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A snowmobile comprising:
   a frame;
   an engine disposed on the frame;
   a drive track disposed below the frame and operatively connected to the engine for propulsion of the snowmobile;
   a straddle seat assembly attached to the frame rearward of the engine, the straddle seat assembly comprising
      a first seat portion having a first seat surface for a driver, the first seat surface being generally horizontal;
      a second seat portion disposed rearwardly of the first seat portion, the second seat portion having a second seat surface for a first passenger, the second seat surface being generally horizontal;
      a third seat portion disposed rearwardly of the second seat portion, the third seat portion having a third seat surface for a second passenger, the third seat surface being generally horizontal;
      a first intermediate surface disposed on one of the first seat portion and the second seat portion, the first intermediate surface being disposed rearwardly of the first seat surface and forwardly of the second seat surface, the first intermediate surface being inclined with respect to the first seat surface;
      a second intermediate surface disposed on one of the second seat portion and the third seat portion, the second intermediate surface being disposed rearwardly of the second seat surface and forwardly of the third seat surface, the second intermediate surface being inclined with respect to the second seat surface;
      the second seat portion and the third seat portion being selectively detachable from the frame;
   two skis disposed on the frame; and
   a steering device disposed on the frame forward of the straddle seat assembly and operatively connected to the two skis for steering the snowmobile.

2. The snowmobile of claim 1, wherein the frame comprises a tunnel and the straddle seat assembly is attached to the tunnel.

3. The snowmobile of claim 2, wherein the second seat portion and the third seat portion are integral and only detachable from the frame as a unit.

4. The snowmobile of claim 3, wherein the first seat portion is selectively detachable from the frame.

5. The snowmobile of claim 3, wherein a storage space is created when the second seat portion and the third seat portion are detached from the frame.

6. The snowmobile of claim 2, wherein the second seat portion and the third seat portion are separately selectively detachable from the frame.

7. The snowmobile of claim 6, wherein a storage space is created when at least one of the second seat portion and the third seat portion are detached from the frame.

8. The snowmobile of claim 6, wherein the third seat portion is constructed and arranged to be selectively releasably attachable to the frame adjacent to and rearward of the first seat portion when the second seat portion has been detached from the frame.

9. The snowmobile of claim 8, wherein when the third seat portion is attached to the frame adjacent to and rearward of the first seat portion, the snowmobile further comprises a storage space rearward of the third seat portion.

10. The snowmobile of claim 8, further comprising a backrest mounted to the third seat portion.

11. The snowmobile of claim 10, wherein the backrest is movably mounted to the third seat portion.

12. The snowmobile of claim 6, wherein, the third seat portion is constructed and arranged to be selectively releasably attachable to the frame adjacent to and rearward of the first seat portion and the second seat portion is constructed and arranged to be selectively releasable attachable to the frame adjacent to and rearward of the third seat portion, whereby the second seat portion and the third seat portion are interchangeable on the snowmobile.

13. The snowmobile of claim 3, wherein the second seat surface and the third seat surface are higher than the first seat surface.

14. The snowmobile of claim 13, wherein the third seat surface is higher than the second seat surface.

15. A snowmobile comprising:
   a frame;
   an engine disposed on the frame; a drive track disposed below the frame and operatively connected to the engine for propulsion of the snowmobile;
   a straddle seat assembly attached to the frame rearward of the engine, the straddle seat comprising
      a first seat portion having a first seat surface for a driver, the first seat surface being generally horizontal;
      a second seat portion disposed rearwardly of the first seat portion, the second seat portion having a second seat surface for a first passenger, the second seat surface being generally horizontal;
      a third seat portion disposed rearwardly of the second seat portion, the third seat portion having a third seat surface for a second passenger, the third seat surface being generally horizontal;
      a first intermediate surface disposed on one of the first seat portion and the second seat portion, the first intermediate surface being disposed rearwardly of the first seat surface and forwardly of the second seat surface, the first intermediate surface being inclined with respect to the first seat surface;

a second intermediate surface disposed on one of the second seat portion and the third seat portion, the second intermediate surface being disposed rearwardly of the second seat surface and forwardly of the third seat surface, the second intermediate surface being inclined with respect to the second seat surface;

the second seat surface and the third seat surface being higher than the first seat surface;

two skis disposed on the frame; and a steering device disposed on the frame forward of the seat assembly and operatively connected to the two skis for steering the snowmobile.

16. The snowmobile of claim 15, wherein the third seat surface is higher than the second seat surface.

17. A snowmobile comprising:

a frame having a tunnel;

an engine disposed on the frame;

a drive track disposed below the frame and operatively connected to the engine for propulsion of the snowmobile;

a straddle seat assembly attached to the tunnel rearward of the engine, the straddle seat assembly comprising a first seat portion for a driver, a second seat portion for a first passenger, a third seat portion for a second passenger, and a backrest mounted to the third seat portion, the second seat portion and the third seat portion being separately selectively detachable from the frame;

the third seat portion being constructed and arranged to be selectively releasably attachable to the frame adjacent to and rearward of the first seat portion when the second seat portion has been detached from the frame;

two skis disposed on the frame; and a steering device disposed on the frame forward of the straddle seat assembly and operatively connected to the two skis for steering the snowmobile.

18. The snowmobile of claim 17, wherein the backrest is movably mounted to the third seat portion.

* * * * *